United States Patent [19]
Kurtzberg et al.

[11] Patent Number: 5,546,329
[45] Date of Patent: *Aug. 13, 1996

[54] EVALUATION AND RANKING OF MANUFACTURING LINE NON-NUMERIC INFORMATION

[75] Inventors: Jerome M. Kurtzberg; Menachem Levanoni, both of Yorktown Heights, N.Y.

[73] Assignee: International Business Machines Corporation, Armonk, N.Y.

[*] Notice: The term of this patent shall not extend beyond the expiration date of Pat. No. 5,479,361.

[21] Appl. No.: 456,816

[22] Filed: Jun. 1, 1995

Related U.S. Application Data

[63] Continuation of Ser. No. 217,272, Mar. 24, 1994, Pat. No. 5,479,361, which is a continuation of Ser. No. 843,048, Feb. 27, 1992, Pat. No. 5,351,202.

[51] Int. Cl.$^6$ .............................. G01D 7/02; G01D 9/28; G06F 17/10
[52] U.S. Cl. ............... 364/552; 364/468.15; 364/551.01; 364/554; 364/581
[58] Field of Search ............................... 364/552, 551.01, 364/554, 582, 581, 468, 469, 470–473, 474.02, 474.16, 474.15, 474.22

[56] References Cited

U.S. PATENT DOCUMENTS

| | | | |
|---|---|---|---|
| 4,089,056 | 5/1978 | Barna et al. | 364/551.01 |
| 4,115,848 | 9/1978 | Kogure et al. | 364/154 |
| 4,328,556 | 5/1982 | Abe et al. | 364/172 |
| 4,604,718 | 8/1986 | Norman et al. | 364/578 |
| 4,858,154 | 8/1989 | Anderson et al. | 364/554 |
| 4,870,590 | 9/1989 | Kawata et al. | 364/468 |
| 5,008,842 | 4/1991 | Nagai et al. | 364/551.01 |
| 5,047,947 | 9/1991 | Stump | 364/468 |
| 5,140,537 | 8/1992 | Tullis | 364/578 |
| 5,150,288 | 9/1992 | Imai et al. | 364/132 |
| 5,177,688 | 1/1993 | Rentschler et al. | 364/468 |
| 5,229,948 | 7/1993 | Wei et al. | 364/468 |
| 5,339,257 | 8/1994 | Layden et al. | 364/552 |

*Primary Examiner*—Ellis B. Ramirez
*Assistant Examiner*—M. Kemper
*Attorney, Agent, or Firm*—Sterne, Kessler, Goldstein & Fox P.L.L.C.; Stephen C. Kaufman, Esq.

[57] ABSTRACT

An apparatus and method for quantitatively ranking the performance of each attribute contributing to a manufacturing process. Various signals representing the measure (i.e., quality or yield) of a manufacturing run and representing the attributes that contributed to each manufacturing run are recorded. An iterative process is commenced whereby numeric weights are assigned to each attribute. In a first iterative step, the weight of each attribute is determined to be the weighted average of the measure of each manufacturing run to which that attribute contributed. In subsequent iteration steps, a refined weight for each attribute is determined by computing the ratio between the normalized measure and the product of all other weights associated with that manufacturing run. The iterations are continued until the weights determined for each attribute converge or become self consistent. In this manner, the performance of non-numeric or attribute parameters such as operators and tools can be measured and defined in terms of a numeric quantity.

11 Claims, 3 Drawing Sheets

EVALUATION AND RANKING OF MANUFACTURING LINE NON-NUMERIC INFORMATION

This application is a continuation of application No. 08/217,272, filed Mar. 24, 1994, now U.S. Pat. No. 5,479,361, which is a continuation of application No. 07/843,048, filed Feb. 27, 1992, now U.S. Pat. No. 5,351,202, issued Sep. 27, 1994.

TECHNICAL FIELD

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

The present invention is concerned with improvements in manufacturing line processes. More particularly, the present invention relates to improving the determination and evaluation of manufacturing line information. Still more particularly, the present invention relates to a method for evaluating and ranking non-numeric manufacturing line information to evaluate the performance of the line and ultimately improve the quality of products turned out by the line.

BACKGROUND ART

In a manufacturing line of almost any type, there are a number of factors that control and/or affect the quality of the manufacturing process and of the product produced by the process. Some of the controlling or operative factors are numeric, such as temperature, time, distance between stations, tool settings, etc. These numeric factors are easily quantifiable. Other factors are non-numeric and are not readily quantifiable. Such factors, called "attribute" information, include the specific machine or tool, the particular operator or combination of operators, the workshift, quality of starting materials, and the like. Each of the numeric and non-numeric factors controls or has an effect on the quality of the final product. For adequate control of the manufacturing line, it is desirable to optimize its parametrics (numeric information) as well as its attributes (non-numeric information).

It would be very useful to be able to quantify the non-numeric factors. By doing so, a line manager or supervisor could then make appropriate adjustments to the manufacturing line to obtain improved product yields or quality.

As an illustration of the problem, consider the manufacturing of an MLC (multi-layer ceramic) package. The manufacturing process consists of stacking many layers of ceramic "sheets". The stacked sheets are then sintered. The process involves multiple intermediate or starting products and materials, different tools, and multiple operators. The parametrics include the number of sheets in a stack, the number of stacks in the line, and the sintering temperature and times. The attributes of the MLC manufacturing process include such things as the identities of the operators (OP-ID), the particular stacking tool(s) used on the line, the particular sintering chamber(s), the particular measuring tools, the work-shift(s) (that is, whether the line is running on the day shift, the night shift or the "graveyard" shift), the vendors from whom starting materials are purchased, etc.

Process yield is the primary performance measure. It is desired to evaluate the performance of all the tools and operators used on the MLC manufacturing line so that "bad" tools can be fixed or replaced and "poor" operators can be retrained. The evaluating mechanism should itself yield good results even when not all the combinations of attributes occur in reality. In addition, the mechanism should resolve conflicting "opinions" correctly.

The present inventors are aware of a number of known systems which purport to control manufacturing processes. To their knowledge, all of the known systems operate on numeric data only. Such known systems are represented by the following issued U.S. patents:

U.S. Pat. No. 4,089,056 METHOD AND AUTOMATED EQUIPMENT FOR THE TRACKING, CONTROL AND SYNTHESIZING OF MANUFACTURING PERFORMANCE FIGURES.

U.S. Pat. No. 4,115,848 METHOD AND SYSTEM FOR CONTROLLING PLANTS.

U.S. Pat. No. 4,328,556 CONTROL SYSTEM OF PLANTS BY MEANS OF ELECTRONIC COMPUTERS.

U.S. Pat. No. 4,604,718 COMPUTER SIMULATION SYSTEM.

U.S. Pat. No. 4,858,154 INTERLABORATORY QUALITY ASSURANCE PROGRAM.

U.S. Pat. No. 4,870,590 MANUFACTURING LINE CONTROL SYSTEM.

U.S. Pat. No. 5,008,842 METHOD OF SEQUENTIAL MONITORING AND APPARATUS FOR PRACTICING THE SAME.

U.S. Pat. No. 5,047,947 METHOD OF MODELLING THE ASSEMBLY OF PRODUCTS TO INCREASE PRODUCTION YIELD.

The known systems exemplified by the above-listed patent disclosures all have at least one thing in common. None of them takes into account the non-numeric components of the manufacturing line process which contribute to the product yield of the line.

For example, the '056 patent describes a system for generating coded information from a plurality of electromechanical transducer units associated with respective machines to be supervised. Control of the manufacturing line is based on the data collected from the transducer units.

The '848 and '556 patents describe related process control systems and methods in which the operation of the plant (e.g., an electric power generating plant, a chemical processing plant, etc.) is controlled on the basis of tables stored in a computer and variations from norms detected by process input devices. The system is continuously controlled on the basis of comparing measured parameters with information stored in the tables.

The '718 patent describes a system for computer simulating the operation of a user-specified automated manufacturing and/or materials handling facility. The facility designer specifies various computer-controlled components and operating parameters which are to be tested. The designer selects from lists of predetermined components and operating parameters. The computer then creates an operational prototype model of the actual system.

The '154 patent describes a technique for statistically evaluating the performance, precision, and/or accuracy of one of a plurality of like instruments. The technique calls for comparing the performance of each instrument located in physically disparate locations. The patent is specifically directed to evaluating the performance of blood analyzers as part of an Interlaboratory Quality Assurance Program (IQAP).

The '590 patent describes a manufacturing line control system in which various analog, digital and status signal information issuing from a product on the line is evaluated. Control signals are then issued to the manufacturing line based on the detected product information.

The '842 patent describes a method and apparatus for sequentially monitoring the state of a working manufacturing line. As with other known systems, sensors on the line detect various parameters on the manufacturing line, including emulsion application, web density, web winding, etc. As with other known systems, all of the parameters measured are numeric quantities.

The '947 patent describes a method for increasing the production or manufacturing yield of a product by the application of mathematical modeling techniques on the statistical distributions of major components of the product to maximize the production yield of the products. Initially, the statistical characteristics of significant performance specifications of each of the major components of the product are established for each manufacturing lot of that component. The statistically probable performance of products assembled from different manufacturing lots is evaluated to assess the performance sensitivity of the assembled product to different combinations of the components from different manufacturing lots.

In order to maximize the yield from a given manufacturing line, it is desirable to account for non-numeric, as well as numeric, factors. It is well known empirically that non-numeric factors can play a significant role in product yield or quality. For example, studies have shown that automobiles manufactured on a Monday are statistically likely to have a higher percentage of defects than those coming off the assembly line on a Tuesday or Wednesday. No two milling machines are identical. Two assembly lines using two different milling machines will produce products that are not exactly identical. This concept carries over to all aspects of a manufacturing process. While absolute identity of finished products is not always essential, there are times, perhaps in some critical processes, when it is desirable to come as close as possible to absolute uniformity of finished product, whether from a single manufacturing line or from a plurality of similar lines.

The present invention was developed to take into account non-numeric factors which affect manufacturing lines. The present invention overcomes the deficiencies of known systems in this respect.

DISCLOSURE OF INVENTION

The present invention provides an apparatus and method for assigning a quantitative ranking to non-numeric attributes that contribute to the process of a manufacturing line. The present invention can be used to quantitatively measure the performance of non-numeric, or attribute, data including the performance of particular tools or machines on the manufacturing line, the performance of particular operators on the manufacturing line, and the effects of external conditions such as weather and shift changes.

The technique of the present invention is to normalize the performance measure of a particular manufacturing line run to a value between 0 and 1. Performance measure typically defined in terms of process unit or quality. Each measure can then be written as a product of all the weight responsible for that measure. One weight is contributed by each attribute and the range of attribute weights is 0 to 1, 1 being perfect.

The present invention comprises a technique for deconvoluting the individual attribute weights associated with a given process, thus permitting one to evaluate the significance of each attribute associated with the entire manufacturing process, independent of all other attributes.

In the technique of the present invention, the measures of several manufacturing runs and the attributes associated with each run are recorded. The measure for each run is then normalized to a number between $\epsilon$ and 1 where $\epsilon$ is very near 0, thus expressing each measure as a fraction of the perfect measure of 1. In a first iteration, the weight of each attribute is taken as the weighted average of the measures of the manufacturing runs to which that attribute contributed. In subsequent iterations, new weights for each attribute are computed as the ratio between the normalized measure of the manufacturing run and the product of all other associated weights. The iterations are continued until the refined weights of each attribute converge or become self-consistent. In this manner, given a set of measured performances, the individual contributions of each attribute can be determined, the product of which best describes the total measure. For each non-numeric attribute, a numeric measure can now be assigned.

The foregoing and other objects, features and advantages of the invention will be apparent from the following more particular description of preferred embodiments of the invention, as illustrated in the accompanying drawings.

BEST MODE FOR CARRYING OUT THE INVENTION

1. Overview of the Present Invention

The performance of a manufacturing line depends on a combination of numeric and non-numeric information or data. The numeric data includes quantifiable parametrics such as tool settings, temperatures, process times, etc. Non-numeric, or attribute, information includes qualitative information such as the performance of a particular machine or operator with respect to other machines or operators performing the same function(s), the particular shift during which a product is produced or on which an operator works, the day of the week, the weather, the quality of materials received from a particular vendor, etc.

When adjusting the manufacturing line process, quality of the product and yield of the process should be maximized. This requires proper adjustment of both the parametrics and attributes of the manufacturing line.

Because of the differences in non-numeric, or attribute, data, two products from the same manufacturing line may vary. For example, an automobile assembly line may produce a first automobile which is virtually trouble-free and immediately follow with production of a "lemon." The reason for this is although parametrics can be closely controlled, individual attributes may, and usually do, vary dramatically within a class of attributes. Performance of seemingly identical tools used in the assembly of the automobile may vary as does the performance of each individual operator. Moreover, placing particular operators on a particular shift or rotating shifts may affect quality and yield of the manufacturing process.

Manufacturing processes often have numerous independent attributes working to produce a single continuous measure (e.g. yield). There are often numerous permutations of combinations of individual attributes contributing to the process. This poses a serious impediment to evaluation of each individual attribute. For example a good operator working on a bad machine may produce the same result as a bad operator working on a good machine.

Therefore, it is desired to evaluate each individual attribute and ascribe a quantitative value to that attribute which is a measure of its performance independent of the influence of other attributes. To do this, the measure of each individual attribute must be extracted, or deconvoluted, from the other attributes.

As an illustration, one can consider the manufacturing of an MLC package. The manufacturing process consists of stacking many layers of ceramic "sheets" which are then sintered. The process involves different products, tools, and operators, often in different combinations of these individual attributes. The performance measure in this case would be process yield. It is desirable to evaluate the performance of each tool and operator associated with the manufacturing line so that "bad" tools can be fixed or replaced and "poor" operators can be retrained. The evaluating mechanism should yield good results even when not all combinations of attributes occur in reality. In addition, the mechanism should resolve conflicting "opinions" correctly.

Each yield of the MLC manufacturing process contains contributions from individual members of each attribute class. The problem becomes a matter of deconvolution of the effects (i.e., the weights) of individual attributes.

Each performance measure can be normalized to a value between 0 and 1 (e.g., Yield becomes a fraction between 0 and 1). Each measure can then be written as a product of all the weights responsible for that measure. One weight is contributed by each attribute, and the range of attribute weights is 0 to 1, 1 being perfect. Therefore, each of the weights would exactly equal the resultant performance measure if all other attributes were perfect (i.e., with weights of "1").

The present invention comprises a technique for deconvoluting the individual attribute weights associated with a given process. Thus, the technique of this invention permits one to evaluate the significance of each separate attribute associated with the entire manufacturing process. More specifically, by using the technique of the present invention, it is possible to rate each of the tools used on a given line to determine which need to be replaced or repaired; it is also possible to evaluate each of the operators who work on the line to determine which, if any, require retraining to improve their performance.

The present invention provides a technique for ascribing a measure, in a mathematical sense, to each individual attribute. For each attribute, a numerical value, or weight, between 0 and 1 is determined. This weight is a measure of the individual attribute's performance relative to other individual attributes in the attribute class.

The technique of this invention, sometimes called the "self-consistent" or "convergence" approach, is adapted from a well-known technique in atomic physics used to solve the many-body problem of a multi-electron atom. The atomic problem is solved via iterations over products of single-electron wave functions which are derived from the solvable problem of a single electron moving under the influence of the weighted average of all other electrons (and the nucleus). As used in the atomic physics technique and in that of the present invention, "self-consistency" means that the iterated set of the wave functions of all electrons eventually converges such that it is not significantly different from the previous set. Although no formal proof of convergence exists in spite of repeated efforts, it has converged in all known cases in which the technique has been used. (See, for example, Slater, John C., "The Self-consistent Field for Molecules and Solids," McGraw Hill, 1974.)

The method of the present invention extends the known approach to enable its adoption in attribute analysis for manufacturing lines and processes. The attributes are somewhat comparable to the separate atomic wavefunctions; the performance measure represents the total atomic wavefunction. The present inventive technique goes beyond the atomic physics technique by identifying a finite set of members of each attribute class, from which one is used in each given measure.

Figure 1:
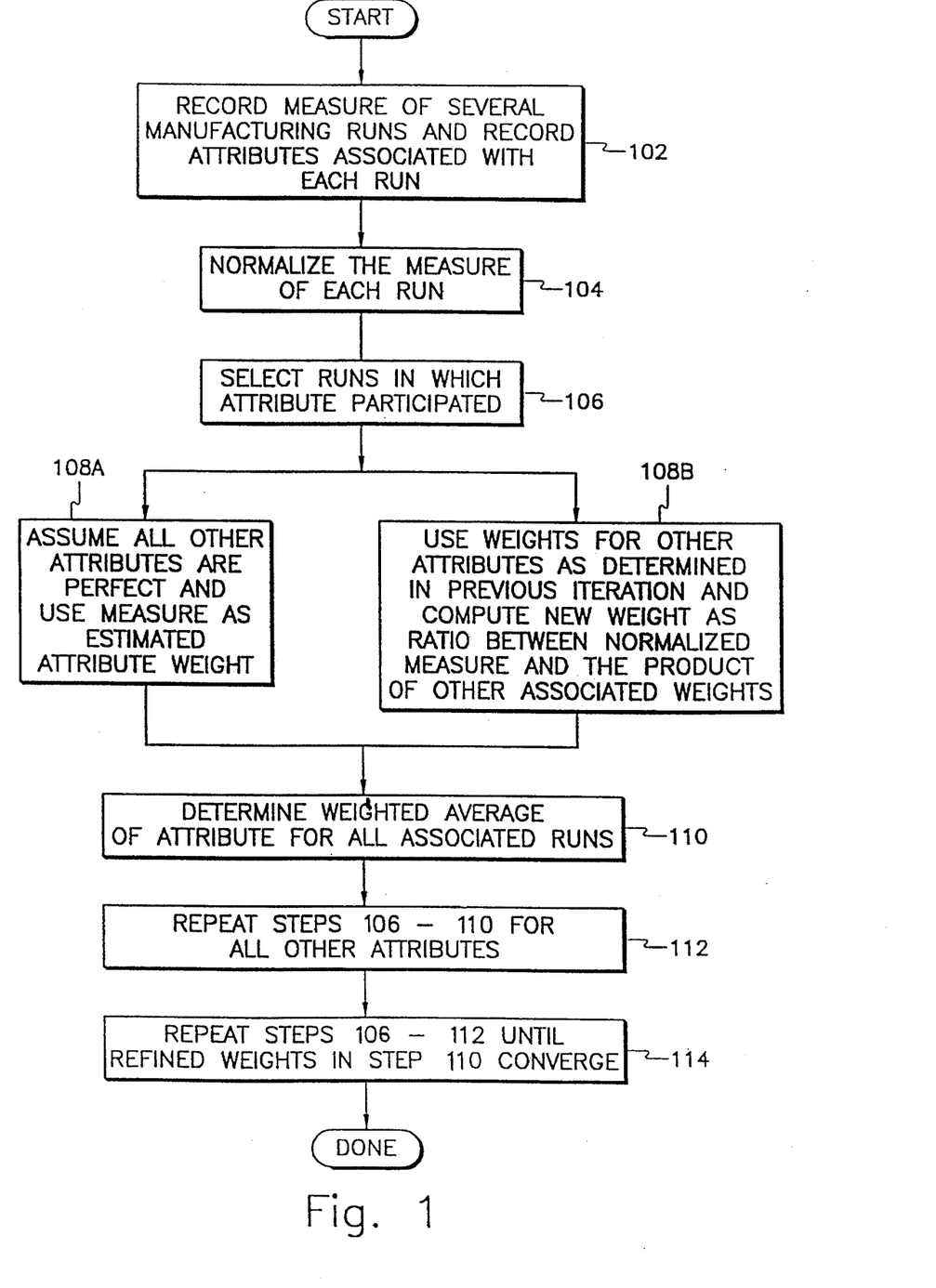
FIG. 1 is a flowchart illustrating the iterative process of the present invention.

FIG. 1 is a flowchart illustrating the technique of the present invention. Referring to FIG. 1, in a step 102, the measures of several manufacturing runs are recorded. As previously noted, measure can be expressed in terms of yield. Also recorded are the attributes associated with each run—i.e., specific tools used or particular operators involved. In a step 104, the measure for each run is normalized to a number between epsilon and 1, where epsilon is very near 0. This is accomplished by subtracting the value of epsilon from the measure and dividing this number by the maximum measure. In this manner, each actual measure can be expressed as a fraction of the perfect measure of 1.

In a step 106, it is determined in which of the recorded runs the first attribute participated. These runs are selected to determine the value or weight of the attribute. In a step 108A, all the other attributes that make up each selected run are assumed to be "perfect," and are therefore not considered. In other words, the measure of each run is attributed entirely to the first attribute. For example, if a given measure is 0.785 the value of the first attribute for that run is taken as 0.785. In a step 110, the weighted average of all measures to which the attribute contributed is determined. This weighted average for the first attribute, provides an initial estimate of the weight of the attribute. In a step 112, steps 106 through 110 are repeated for each of the other attributes. In this manner, an initial estimate of the weight of each attribute is made.

In a step 114, steps 106 through 112 are repeated, this time following a step 108B. In step 108B, the measure of each run is not ascribed entirely to the contribution of the attribute under consideration. Now, each measure has k weights associated with it. These weights are those of each of the k attributes associated with that measure as determined in the previous iteration. A new weight for the attribute is computed as the ratio between the normalized measure and the product of all other associated weights. Therefore, the estimate of the attribute weight obtained in step 110 is a refined estimate.

Step 114 is repeated until the refined weights of each attribute converge or become "self-consistent." To determine when they converge, one compares the current attributes' weights to those weights obtained for that attribute in the previous iteration. This can be done by computing the sum-of-squares of the differences of the two sets, or by computing the maximum of the absolute difference of the two sets.

Each attribute now has a weight which is a weighted measure of all measures in which it is involved, and which is termed convergent.

In effect, given a set of measured performances, the individual contributions of the attributes can be determined, the product of which best describes (through convergence) the total measure. For each non-numeric attribute, a numeric measure can now be assigned.

2. Detailed Description of the Preferred Embodiment

As stated above, the basic technique is to compute a first-guess weight for each attribute while holding the others constant, and then perform iterations using the newly computed weight for each attribute, the iterations continuing until the attribute weights converge. The preferred embodiment of the present invention will now be described.

Figure 2:
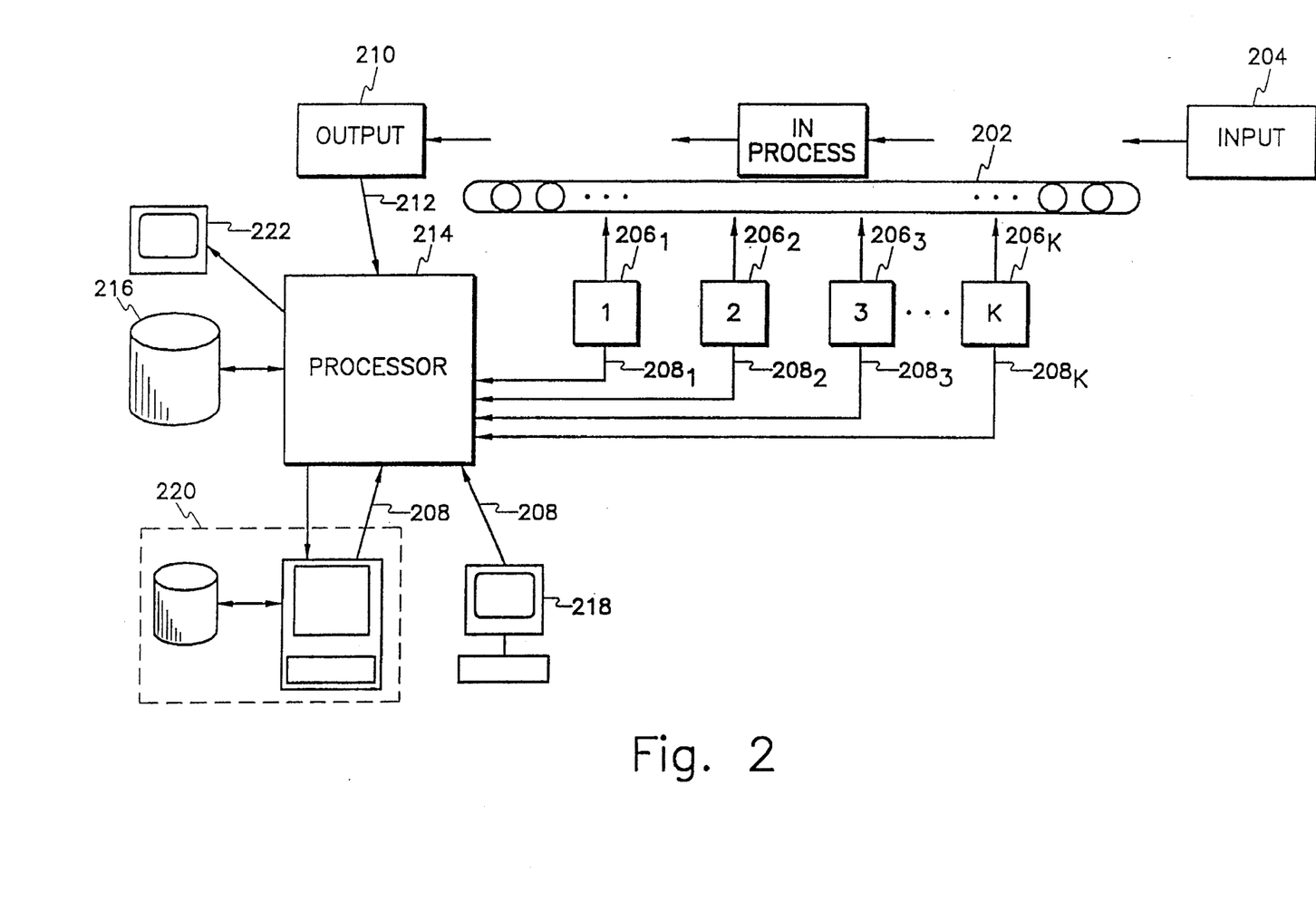
FIG. 2 is a block diagram illustrating the configuration of the present invention.

A block diagram of the present invention is illustrated in FIG. 2. Referring now to FIG. 2, a manufacturing line 202 receives input materials 204 to be processed. Input materials 204 may come from a supply of raw materials, a previous process step, or the like. Attributes 1–K, generally designated 206, perform functions relating to the processing of materials 204 in the process of manufacturing line 202. These attributes 206 can include tools and machinery, various operators, other variables such as day of the week or shift number, and even various manufacturing processes. Each attribute 206, i.e., each operator, each tool, each process, etc. has its own unique attribute signal ID 208. This ID signal 208 is a physical signal that uniquely identifies each attribute 206 contributing to the manufacturing process.

The manufacturing line 202 produces a completed product 210, or a product ready to move on to the next phase of processing. A measure signal 212 provides a quantitative measure of the quality of the manufacturing run. Measure signal 212 is a physical signal that can represent the measure of the run in terms of various metrics such as output yield and output quality. A processor 214 receives measure signals 212 and attribute ID signals 208. Measure signal 212 for each manufacturing run, and ID signals 208 of attributes 206 that contributed to that manufacturing run are stored in a database 216. Additional attribute ID signals 208 can be provided to processor 214 and database 216 for each manufacturing run. These additional attribute ID signals 208 can be provided through various means such as manual entry via a remote terminal 218, automated or semi-automated entry via a remote work station 220.

Referring now to FIGS. 1 and 2, the technique of the present invention will now be described. In step 102 the processor 214 receives measure signals 212 which indicate the output measure 210 of manufacturing line 202 for each manufacturing run. These measure signals 212 are stored on database 216. Processor 214 also receives ID signals 208 indicating each of the attributes that contributed to that particular manufacturing run. These ID signals 208 are also stored in database 216.

In step 104, processor 214 normalizes the measure of each run to a number between $\epsilon$ and 1 where $\epsilon$ is very near 0. Processor 214 accomplishes this normalization by subtracting the value of $\epsilon$ from the measure signal 212 and dividing this number by the maximum measure signal 212. Once a suitable number of manufacturing runs have been recorded, the weighting process can begin. Statistically, a greater number of runs recorded to which an attribute contributed provides a more accurate weight that can be ascribed to that attribute. An editing step may be added to edit runs containing apparently anomalous data points, i.e., runs whose yields are above or below specified bounds, are deleted from the database.

In step 106, processor 214 selects all the manufacturing runs in which the first attribute participated. In step 108A, processor 214 assumes that all other attributes are perfect and temporarily assigns them a weight of 1. As a result, the value of measure signal 212 for each run to which attribute 1 contributed is ascribed entirely to attribute 1. In step 110, processor 214 determines the weighted average of all measure signals 212 to which attribute 1 contributed. This weighted average for the first attribute provides an initial attribute estimate of the weight of the first attribute. Processor 214 stores this initial estimate on database 216.

In step 112, steps 106–110 are repeated for each of the attributes 2–K. In this manner, an initial estimate of the weight of each attribute is made and stored.

In step 114, steps 106–112 are repeated, this time following step 108B. In step 108B, the measure of each run is not ascribed entirely to the contribution of the attribute under consideration as was done in step 108A. Now, each measure has K weights associated with it. These weights are those of each of the K attributes associated with that measure as determined in the previous iteration. Processor 214 computes a new weight for the attribute as the ratio between the normalized measure signal 212 and the product of all other associated weights 1–K. Therefore, the estimate of the attribute weight obtained in step 110 of this iteration is a refined estimate. This refined estimate is stored in database 216. In step 112, processor 214 repeats steps 106, 108B and 110 for each of the attributes, thereby obtaining and storing a refined estimate for each attribute.

In step 114, processor 214 repeats steps 106–112 until the refined weights of each attribute converge or become "self-consistent." To determine when the weights converge, one compares the current weight of each attribute to the weight obtained for that attribute in the previous iteration. This can be done by computing the sum of squares of the differences of the two sets, or by computing the maximum of the absolute difference of the two sets.

Processor 214 generates and prints reports and graphics based on the information contained in database 216. Reports selected can include information such as alpha numeric representations of measure signals 212 and ID signals 208 associated with each manufacturing run, measure signals and ID signals 208 for each individual attribute, or numerous other combinations of the information stored in database 216. Alternatively, this information can be displayed on a display monitor 222 or sent to work station 220 for further manipulation and/or display.

Table 1 provides an example of physical signal information that may be stored in database 216.

TABLE 1

| YIELD | @MEFAM | @TOOL | @SCREENER | @OPID |
|---|---|---|---|---|
| 0.99 | 143 | ORAF0000 | 28 | 637 |
| 0.99 | 141 | ORAF0000 | 23 | 225 |
| 0.97 | 145 | ORAG0000 | 28 | D63 |
| 0.86 | 143 | ORAG0000 | 22 | 261 |
| 0.94 | 143 | ORAF0000 | 28 | 637 |
| 0.96 | 145 | ORAG0000 | 22 | 261 |
| 0.92 | 153 | ORAF0000 | 29 | 604 |
| 0.92 | 141 | ORAG0000 | 21 | 848 |
| 0.96 | 143 | ORAP0000 | 29 | 560 |
| 0.91 | 145 | ORAG0000 | 20 | 426 |
| 0.93 | 143 | ORAF0000 | 28 | 637 |
| 0.88 | 143 | ORAP0000 | 22 | 233 |
| 0.92 | 143 | ORAF0000 | 28 | D63 |
| 0.99 | 143 | ORAP0000 | 22 | S95 |
| 0.86 | 143 | ORAF0000 | 26 | 568 |
| 0.92 | 153 | ORAG0000 | 27 | C02 |
| 0.91 | 153 | ORAF0000 | 27 | 426 |
| 0.98 | 142 | ORAE0000 | 21 | 848 |
| 0.98 | 143 | ORAE0000 | 28 | 637 |
| 0.98 | 142 | ORAF0000 | 21 | 848 |
| 0.81 | 143 | ORAE0000 | 21 | C79 |
| 0.90 | 143 | ORAG0000 | 26 | 890 |
| 0.96 | 145 | ORAG0000 | 29 | 604 |
| 0.99 | 143 | ORAF0000 | 26 | 21S |
| 0.93 | 143 | ORAG0000 | 29 | 090 |
| 0.95 | 143 | ORAF0000 | 26 | 890 |
| 0.95 | 143 | ORAF0000 | 26 | 568 |
| 0.90 | 155 | ORAE0000 | 20 | 225 |
| 0.91 | 141 | ORAE0000 | 28 | 231 |
| 0.97 | 141 | ORAG0000 | 28 | 637 |
| 0.94 | 145 | ORAE0000 | 29 | 604 |
| 0.96 | 145 | ORAE0000 | 20 | 592 |
| 0.81 | 145 | ORAG0000 | 29. | 090 |
| 0.94 | 143 | ORAF0000 | 28 | D63 |
| 0.97 | 155 | ORAE0000 | 23 | 225 |

TABLE 1-continued

| YIELD | @MEFAM | @TOOL | @SCREENER | @OPID |
|---|---|---|---|---|
| 0.93 | 152 | ORAG0000 | 28 | 231 |
| 0.95 | 143 | ORAF0000 | 29 | 560 |
| 0.94 | 142 | ORAG0000 | 20 | 181 |
| 0.97 | 143 | ORAF0000 | 26 | 215 |
| 0.79 | 145 | ORAG0000 | 22 | 261 |
| 0.94 | 152 | ORAE0000 | 29 | 604 |
| 0.95 | 152 | ORAG0000 | 28 | 231 |
| 0.95 | 143 | ORAF0000 | 26 | 890 |
| 0.90 | 143 | ORAE0000 | 26 | 426 |
| 0.97 | 143 | ORAF0000 | 26 | 568 |
| 0.95 | 143 | ORAF0000 | 26 | A05 |
| 0.97 | 143 | ORAG0000 | 28 | 231 |
| 0.94 | 145 | ORAE0000 | 21 | C02 |
| 0.87 | 155 | ORAG0000 | 22 | 391 |
| 0.91 | 143 | ORAF0000 | 28 | 231 |
| 0.85 | 143 | ORAF0000 | 28 | 637 |
| 0.87 | 143 | ORAG0000 | 20 | 181 |
| 0.86 | 141 | ORAG0000 | 22 | 233 |
| 0.92 | 145 | ORAE0000 | 21 | 848 |
| 0.96 | 143 | ORAF0000 | 26 | 568 |
| 0.98 | 145 | ORAE0000 | 28 | 637 |
| 0.96 | 155 | ORAE0000 | 28 | 637 |
| 0.98 | 152 | ORAF0000 | 28 | 637 |
| 0.77 | 145 | ORAE0000 | 20 | 181 |
| 0.86 | 153 | ORAP0000 | 20 | 432 |
| 0.96 | 145 | ORAE0000 | 27 | B28 |
| 0.92 | 145 | ORAE0000 | 22 | 231 |
| 0.92 | 145 | ORAE0000 | 21 | 426 |
| 0.95 | 143 | ORAF0000 | 28 | 231 |
| 0.84 | 145 | ORAE0000 | 20 | 354 |
| 0.90 | 153 | ORAF0000 | 29 | 604 |
| 0.97 | 145 | ORAE0000 | 20 | 354 |
| 1.86 | 142 | ORAF0000 | 23 | 255 |
| 0.98 | 143 | ORAF0000 | 26 | 568 |
| 1.00 | 147 | ORAF0000 | 27 | C02 |
| 0.96 | 145 | ORAE0000 | 26 | 568 |
| 0.99 | 145 | ORAE0000 | 26 | 890 |
| 0.94 | 145 | ORAE0000 | 27 | 371 |
| 0.98 | 145 | ORAE0000 | 28 | 637 |
| 1.00 | 145 | ORAE0000 | 21 | 848 |
| 0.95 | 152 | ORAF0000 | 26 | 568 |
| 0.92 | 145 | ORAE0000 | 22 | 215 |
| 0.91 | 143 | ORAF0000 | 26 | 568 |
| 0.98 | 145 | ORAF0000 | 28 | 637 |
| 0.94 | 145 | ORAE0000 | 26 | 568 |
| 0.47 | 143 | ORAF0000 | 21 | 848 |
| 0.82 | 145 | ORAG0000 | 21 | 152 |
| 0.95 | 145 | ORAE0000 | 28 | 637 |
| 0.95 | 145 | ORAG0000 | 21 | 152 |
| 0.89 | 145 | ORAG0000 | 21 | 231 |
| 0.90 | 145 | ORAG0000 | 22 | 215 |
| 0.92 | 145 | ORAE0000 | 22 | 090 |
| 0.95 | 145 | ORAG0000 | 20. | 354 |
| 0.75 | 145 | ORAE0000 | 22 | 569 |
| 0.79 | 145 | ORAG0000 | 20 | 354 |
| 0.97 | 145 | ORAE0000 | 28 | D6J |
| 0.92 | 142 | ORAF0000 | 21 | D63 |
| 0.89 | 145 | ORAG0000 | 20 | 354 |
| 1.00 | 145 | ORAF0000 | 26 | 890 |
| 1.00 | 145 | ORAE0000 | 20 | 569 |
| 0.97 | 145 | ORAG0000 | 21 | 152 |
| 1.00 | 145 | ORAG0000 | 26 | 568 |
| 1.00 | 145 | ORAG0000 | 22 | 215 |
| 0.97 | 145 | ORAE0000 | 22 | 090 |
| 0.97 | 145 | ORAG0000 | 28 | 637 |
| 0.97 | 145 | ORAG0000 | 22 | 090 |
| 0.95 | 143 | ORAP0000 | 28 | D63 |
| 0.97 | 145 | ORAE0000 | 27 | 371 |
| 0.91 | 145 | ORAE0000 | 22 | 215 |
| 0.98 | 152 | ORAF0000 | 20 | 592 |
| 0.00 | 145 | ORAE0000 | 26 | 568 |
| 0.99 | 145 | ORAG0000 | 29 | 604 |
| 0.89 | 145 | ORAE0000 | 26 | 568 |
| 0.96 | 145 | ORAG0000 | 20 | 354 |
| 0.98 | 153 | ORAF0000 | 29 | 592 |
| 0.96 | 145 | ORAG0000 | 22 | 261 |
| 0.96 | 145 | ORAG0000 | 27 | 592 |
| 0.97 | 145 | ORAE0000 | 27 | C02 |
| 1.00 | 145 | ORAE0000 | 21 | 152 |
| 1.00 | 145 | ORAG0000 | 21 | C02 |
| 0.13 | 143 | ORAF0000 | 21 | 848 |
| 0.94 | 145 | ORAE0000 | 27 | C02 |
| 0.67 | 145 | ORAG0000 | 21 | 152 |
| 0.94 | 145 | ORAG0000 | 22 | 791 |
| 0.95 | 143 | ORAF0000 | 26 | 890 |
| 0.98 | 141 | ORAF0000 | 21 | 848 |
| 0.97 | 155 | ORAG0000 | 30 | 467 |
| 1.00 | 141 | ORAG0000 | 21 | 231 |
| 0.95 | 145 | ORAE0000 | 21 | 848 |
| 0.97 | 141 | ORAF0000 | 26 | CT |
| 0.99 | 141 | ORAE0000 | 20 | 354 |
| 0.92 | 155 | ORAE0000 | 22 | 261 |
| 0.94 | 143 | ORAF0000 | 28 | D63 |
| 0.93 | 152 | ORAF0000 | 29 | 560 |
| 0.90 | 145 | ORAG0000 | 26 | 568 |
| 0.98 | 147 | ORAE0000 | 27 | C02 |
| 0.99 | 142 | ORAG0000 | 28 | 090 |
| 0.99 | 314 | ORAE0000 | 28 | 090 |
| 0.97 | 153 | ORAG0000 | 29 | 592 |
| 0.92 | 143 | ORAF0000 | 29 | 755 |
| 0.97 | 145 | ORAE0000 | 21 | 848 |
| 0.98 | 143 | ORAP0000 | 20 | 181 |
| 0.95 | 145 | ORAG0000 | 28 | D63 |
| 0.95 | 143 | ORAG0000 | 20 | 354 |
| 0.98 | 145 | ORAE0000 | 21 | 848 |
| 0.99 | 145 | ORAG0000 | 29 | D67 |
| 0.97 | 143 | ORAF0000 | 20 | 595 |
| 0.98 | 143 | ORAF0000 | 29 | 755 |
| 0.91 | 145 | ORAE0000 | 28 | 063 |
| 1.00 | 147 | ORAG0000 | 29 | 592 |
| 0.90 | 145 | ORAE0000 | 22 | 215 |
| 0.97 | 145 | ORAE0000 | 29 | D67 |
| 0.92 | 143 | ORAF0000 | 20 | 181 |
| 0.93 | 153 | ORAF0000 | 22 | 225 |
| 0.88 | 143 | ORAF0000 | 21 | 231 |
| 0.96 | 143 | ORAE0000 | 20 | 595 |
| 0.88 | 157 | ORAE0000 | 28 | D65 |
| 0.97 | 143 | ORAG0000 | 26 | 568 |
| 0.90 | 143 | ORAG0000 | 26 | 568 |
| 0.98 | 145 | ORAG0000 | 22 | A56 |
| 0.95 | 145 | ORAE0000 | 22 | A56 |
| 1.00 | 157 | ORAG0000 | 26 | 120 |
| 0.98 | 157 | ORAG0000 | 28 | C79 |
| 0.93 | 143 | ORAF0000 | 20 | 354 |
| 0.95 | 143 | ORAF0000 | 20 | 354 |
| 0.95 | 143 | ORAE0000 | 29 | 215 |
| 0.88 | 145 | ORAE0000 | 26 | 890 |
| 1.00 | 145 | ORAG0000 | 27 | 371 |
| 0.97 | 145 | ORAG0000 | 29 | D67 |
| 0.97 | 145 | ORAG0000 | 21 | 426 |
| 0.97 | 145 | ORAG0000 | 26 | 568 |
| 0.91 | 145 | ORAG0000 | 20 | 354 |
| 0.96 | 145 | ORAG0000 | 26 | 568 |
| 0.92 | 145 | ORAG0000 | 21 | 261 |
| 0.94 | 145 | ORAE0000 | 20 | 354 |
| 0.89 | 145 | ORAG0000 | 22 | 231 |
| 0.97 | 145 | ORAE0000 | 29 | D67 |
| 0.97 | 145 | ORAE0000 | 29 | 604 |
| 0.94 | 145 | ORAG0000 | 27 | B28 |
| 0.84 | 145 | ORAE0000 | 21 | 426 |
| 1.00 | 145 | ORAG0000 | 22 | 261 |
| 0.91 | 145 | ORAG0000 | 27 | C02 |
| 0.95 | 145 | ORAE0000 | 20 | 354 |
| 0.96 | 145 | ORAG0000 | 29 | D67 |
| 0.93 | 145 | ORAE0000 | 21 | E19 |
| 0.98 | 145 | ORAG0000 | 28 | 637 |
| 0.93 | 145 | ORAE0000 | 26 | CT |
| 0.98 | 145 | ORAE0000 | 26 | 568 |
| 0.87 | 145 | ORAG0000 | 27 | B28 |
| 0.95 | 145 | ORAG0000 | 22 | 215 |
| 0.83 | 145 | ORAG0000 | 27 | B28 |
| 0.98 | 145 | ORAG0000 | 29 | 592 |
| 0.67 | 145 | ORAG0000 | 28 | D63 |
| 0.82 | 145 | ORAE0000 | 27 | 181 |

TABLE 1-continued

| YIELD | @MEFAM | @TOOL | @SCREENER | @OPID |
|---|---|---|---|---|
| 0.96 | 145 | ORAE0000 | 21 | 848 |
| 0.93 | 145 | ORAG0000 | 28 | D63 |
| 0.99 | 145 | ORAE0000 | 29 | 592 |
| 0.99 | 145 | ORAG0000 | 29 | 592 |
| 0.96 | 145 | ORAE0000 | 27 | B28 |
| 0.97 | 145 | ORAE0000 | 29 | D67 |
| 1.00 | 145 | ORAE0000 | 26 | CT |
| 0.78 | 145 | ORAE0000 | 26 | 568 |
| 0.93 | 145 | ORAE0000 | 21 | 426 |
| 0.98 | 145 | ORAG0000 | 20. | 637 |
| 0.99 | 145 | ORAG0000 | 20 | 637 |
| 0.94 | 145 | ORAE0000 | 21 | 426 |
| 0.98 | 145 | ORAE0000 | 27 | 595 |
| 0.96 | 145 | ORAG0000 | 29 | D67 |
| 0.98 | 145 | ORAG0000 | 28 | 568 |
| 0.97 | 145 | ORAE0000 | 21 | 848 |
| 0.98 | 145 | ORAG0000 | 29 | 604 |
| 0.75 | 145 | ORAG0000 | 28 | D63 |
| 0.99 | 145 | ORAE0000 | 22 | 261 |
| 0.90 | 145 | ORAE0000 | 21 | 857 |
| 0.94 | 145 | ORAE0000 | 27 | C02 |
| 0.77 | 145 | ORAE0000 | 22 | 261 |
| 0.94 | 145 | ORAG0000 | 28 | 637 |
| 0.99 | 145 | ORAG0000 | 21 | E19 |
| 0.97 | 145 | ORAG0000 | 29 | 604 |
| 0.97 | 145 | ORAE0000 | 29 | 604 |
| 0.96 | 145 | ORAE0000 | 28 | 637 |
| 0.95 | 145 | ORAE0000 | 28 | 637 |
| 0.96 | 145 | ORAE0000 | 28 | 637 |
| 0.90 | 145 | ORAG0000 | 22 | A56 |
| 0.99 | 145 | ORAG0000 | 26 | CT |
| 6.93 | 145 | ORAE0000 | 27 | C02 |
| 0.92 | 145 | ORAG0000 | 29 | 604 |
| 1.00 | 145 | ORAG0000 | 28 | 637 |
| 0.89 | 145 | ORAE0000 | 28 | D63 |
| 0.97 | 145 | ORAG0000 | 26 | 215 |
| 0.94 | 145 | ORAG0000 | 27 | C02 |
| 0.96 | 145 | ORAG0000 | 26 | 568 |
| 0.90 | 145 | ORAE0000 | 21 | 848 |
| 0.97 | 145 | ORAG0000 | 22 | 261 |
| 0.97 | 145 | ORAG0000 | 28 | 637 |
| 0.93 | 145 | ORAE0000 | 21 | 857 |
| 0.95 | 145 | ORAG0000 | 28 | 748 |
| 0.90 | 145 | ORAG0000 | 27 | C02 |
| 0.75 | 145 | ORAG0000 | 27 | 371 |
| 0.97 | 145 | ORAG0000 | 28 | 748 |
| 0.81 | 145 | ORAE0000 | 21 | 857 |
| 1.00 | 145 | ORAG0000 | 28 | D63 |
| 1.00 | 145 | ORAE0000 | 22 | A56 |
| 0.78 | 145 | ORAG0000 | 26 | 890 |
| 1.00 | 145 | ORAG0000 | 21 | 857 |
| 0.68 | 145 | ORAE0000 | 28 | D67 |
| 0.82 | 145 | ORAE0000 | 22 | 770 |
| 0.86 | 145 | ORAE0000 | 21 | 848 |
| 0.97 | 145 | ORAE0000 | 21 | 848 |
| 0.97 | 145 | ORAE0000 | 20 | 181 |
| 0.91 | 145 | ORAE0000 | 20 | 181 |
| 1.00 | 145 | ORAE0000 | 20 | 181 |
| 1.00 | 145 | ORAG0000 | 21 | 848 |
| 0.88 | 145 | ORAE0000 | 26 | 890 |
| 0.94 | 145 | ORAE0000 | 20 | 037 |
| 1.00 | 145 | ORAG0000 | 21 | E19 |
| 0.80 | 155 | ORAG0000 | 26 | 890 |
| 0.97 | 155 | ORAE0000 | 21 | 349 |
| 0.95 | 155 | ORAG0000 | 20, | 354 |
| 0.97 | 155 | ORAE0000 | 26 | 568 |
| 0.93 | 155 | ORAG0000 | 26 | 568 |
| 0.88 | 155 | ORAE0000 | 26 | 890 |
| 1.00 | 155 | ORAG0000 | 29 | 604 |
| 0.90 | 155 | ORAG0000 | 29 | 604 |
| 0.90 | 155 | ORAG0000 | 28 | 75S |
| 0.91 | 155 | ORAF0000 | 28 | D05 |
| 0.88 | 155 | ORAF0000 | 27 | B28 |
| 0.99 | 155 | ORAE0000 | 29 | 592 |
| 0.96 | 155 | ORAE0000 | 21 | 848 |
| 1.00 | 155 | ORAE0000 | 28 | 292 |
| 0.96 | 155 | ORAG0000 | 20 | 431 |
| 0.88 | 155 | ORAG0000 | 21 | 848 |
| 0.97 | 155 | ORAE0000 | 28 | 637 |
| 0.92 | 155 | ORAE0000 | 20 | C79 |
| 0.97 | 155 | ORAG0000 | 22 | 261 |
| 0.99 | 155 | ORAE0000 | 20 | C79 |
| 0.98 | 155 | ORAG0000 | 27 | 595 |
| 0.99 | 155 | ORAG0000 | 29 | 592 |
| 0.95 | 155 | ORAG0000 | 22 | 215 |
| 1.60 | 155 | ORAG0000 | 26 | CT |
| 0.90 | 155 | ORAE0000 | 28 | A18 |
| 0.98 | 155 | ORAG0000 | 28 | A18 |
| 0.99 | 155 | ORAG0000 | 29 | D67 |
| 0.95 | 155 | ORAG0000 | 26 | 152 |
| 0.97 | 155 | ORAG0000 | 20 | C79 |
| 0.98 | 155 | ORAG0000 | 26 | 568 |
| 0.97 | 155 | ORAG0000 | 26 | 568 |
| 0.89 | 155 | ORAE0000 | 28 | 637 |
| 0.91 | 155 | ORAE0000 | 26 | 215 |
| 1.00 | 155 | ORAE0000 | 26 | D63 |
| 0.96 | 155 | ORAE0000 | 26 | 890 |
| 0.94 | 155 | ORAE0000 | 20 | 354 |
| 0.94 | 155 | ORAE0000 | 28 | D63 |
| 0.94 | 155 | ORAE0000 | 22 | 261 |
| 0.95 | 155 | ORAG0000 | 27 | A05 |
| 0.87 | 155 | ORAG0000 | 21 | 595 |
| 0.93 | 155 | ORAE0000 | 26 | 292 |
| 0.98 | 155 | ORAG0000 | 28 | 890 |
| 1.00 | 155 | ORAG0000 | 28 | 568 |
| 1.00 | 155 | ORAG0000 | 29 | D67 |
| 0.92 | 155 | ORAE0000 | 22 | 429 |
| 0.99 | 155 | ORAE0000 | 22 | 429 |
| 0.99 | 153 | ORAG0000 | 21 | 857 |
| 0.94 | 155 | ORAG0000 | 20 | 595 |
| 0.97 | 155 | ORAE0000 | 21 | 857 |
| 0.96 | 155 | ORAE0000 | 21 | 857 |
| 1.00 | 155 | ORAG0000 | 20 | 181 |
| 1.00 | 155 | ORAG0000 | 20 | 181 |
| 0.97 | 155 | ORAE0000 | 21 | 848 |
| 0.72 | 155 | ORAE0000 | 21 | 857 |
| 1.00 | 155 | ORAG0000 | 20 | 181 |
| 0.81 | 155 | ORAE0000 | 20 | 354 |
| 0.97 | 155 | ORAG0000 | 22 | 261 |
| 1.00 | 155 | ORAE0000 | 21 | 848 |
| 0.92 | 155 | ORAE0000 | 20 | 181 |
| 1.00 | 155 | ORAG0000 | 21 | 857 |
| 0.97 | 155 | ORAG0000 | 21 | 426 |
| 0.61 | 155 | ORAG0000 | 21 | 857 |
| 0.92 | 155 | ORAG0000 | 20 | 595 |
| 1.00 | 155 | ORAE0000 | 21 | 426 |
| 0.97 | 155 | ORAE0000 | 20 | 595 |
| 1.00 | 155 | ORAG0000 | 21 | 426 |
| 1.00 | 15 | ORAE0000 | 21 | 426 |
| 0.94 | 155 | ORAE0000 | 21 | 857 |
| 0.97 | 155 | ORAE0000 | 20 | 181 |
| 1.00 | 155 | ORAE0000 | 20 | 181 |
| 0.90 | 155 | ORAG0000 | 20 | 595 |
| 0.85 | 141 | ORAE0000 | 21 | 857 |
| 0.91 | 155 | ORAG0000 | 21 | 426 |
| 1.00 | 155 | ORAG0000 | 26 | CT |
| 0.94 | 155 | ORAG0000 | 26 | 568 |
| 0.89 | 152 | ORAG0000 | 21 | 848 |
| 1.00 | 152 | ORAF0000 | 29 | 560 |
| 0.94 | 152 | ORAE0000 | 29 | 595 |
| 0.96 | 155 | ORAF0000 | 29 | 090 |
| 6.98 | 151 | ORAF0000 | 29 | 604 |
| 1.00 | 151 | ORAF0000 | 29 | 592 |
| 0.98 | 151 | ORAF0000 | 26 | 890 |
| 0.98 | 151 | ORAP0000 | 20 | 354 |
| 0.97 | 151 | ORAF0000 | 20 | 354 |
| 0.92 | 151 | ORAE0000 | 28 | D67 |
| 0.99 | 151 | ORAF0000 | 20 | 152 |
| 0.87 | 151 | ORAG0000 | 20 | 354 |
| 0.98 | 151 | ORAF0000 | 20 | 595 |
| 0.98 | 152 | ORAF0000 | 21 | 857 |
| 0.99 | 152 | ORAF0000 | 28 | 292 |
| 0.98 | 152 | ORAE0000 | 26 | 748 |
| 0.99 | 152 | ORAG0000 | 26 | 568 |

TABLE 1-continued

| YIELD | @MEFAM | @TOOL | @SCREENER | @OPID |
|---|---|---|---|---|
| 0.98 | 152 | ORAF0000 | 2 | 592 |
| 0.98 | 157 | ORAE0000 | 27 | B28 |
| 1.00 | 157 | ORAG0000 | 29 | D67 |
| 1.00 | 157 | ORAE0000 | 21 | 867 |
| 0.97 | 157 | ORAF0000 | 28 | 637 |
| 0.99 | 157 | ORAF0000 | 20 | A56 |
| 1.00 | 157 | ORAE0000 | 22 | 215 |
| 0.99 | 157 | ORAG0000 | 20 | 354 |
| 1.00 | 157 | ORAE0000 | 26 | 568 |
| 0.99 | 157 | ORAF0000 | 21 | 848 |
| 1.00 | 151 | ORAF0000 | 21 | 467 |
| 1.00 | 151 | ORAG0000 | 20 | 354 |
| 0.97 | 151 | ORAG0000 | 28 | D67 |
| 0.96 | 153 | ORAF0000 | 20 | 181 |
| 0.87 | 153 | ORAF0000 | 22 | C02 |
| 0.91 | 143 | ORAF0000 | 28 | 637 |
| 0.86 | 143 | ORAG0000 | 27 | D67 |
| 0.70 | 143 | ORAF0000 | 21 | D67 |
| 0.93 | 143 | ORAE0000 | 22 | C02 |
| 0.93 | 143 | ORAF0000 | 26 | CT |
| 0.90 | 143 | ORAG0000 | 26 | CT |
| 0.92 | 143 | ORAE0000 | 29 | 755 |
| 0.89 | 143 | ORAF0000 | 28 | 637 |
| 0.75 | 143 | ORAE0000 | 21 | 848 |
| 0.94 | 143 | ORAF0000 | 22 | 215 |
| 0.92 | 143 | ORAF0000 | 20 | E19 |
| 0.96 | 143 | ORAF0000 | 27 | B28 |
| 0.94 | 143 | ORAF0000 | 29 | 604 |
| 0.83 | 143 | ORAF0000 | 29 | 604 |
| 0.92 | 142 | ORAE0000 | 22 | 261 |
| 0.94 | 141 | ORAE0000 | 20 | 595 |
| 0.99 | 142 | ORAF0000 | 29 | 604 |
| 0.91 | 142 | ORAF0000 | 27 | 748 |
| 0.94 | 141 | ORAG0000 | 20 | 595 |
| 0.99 | 141 | ORAF0000 | 22 | 090 |
| 0.98 | 141 | ORAG0000 | 22 | 090 |
| 0.97 | 141 | ORAF0000 | 21 | 800 |
| 0.92 | 141 | ORAE0000 | 20 | 354 |
| 0.96 | 141 | ORAF0000 | 27 | C02 |
| 0.96 | 141 | ORAE0000 | 27 | B28 |
| 0.97 | 141 | ORAE0000 | 29 | D67 |
| 0.97 | 141 | ORAF0000 | 27 | 890 |
| 0.99 | 141 | ORAF0000 | 22 | 261 |
| 0.98 | 141 | ORAP0000 | 21 | 857 |
| 0.91 | 141 | ORAE0000 | 20 | 354 |
| 0.94 | 141 | ORAF0000 | 20 | 354 |
| 0.98 | 141 | ORAF0000 | 27 | 595 |
| 0.93 | 141 | ORAE0000 | 26 | 890 |
| 0.97 | 141 | ORAE0000 | 21 | 857 |
| 1.00 | 141 | ORAF0000 | 27 | C02 |
| 0.98 | 141 | ORAG0000 | 26 | 890 |
| 0.98 | 141 | ORAP0000 | 20 | 354 |
| 0.98 | 142 | ORAG0000 | 21 | 426 |
| 0.99 | 142 | ORAG0000 | 27 | C02 |
| 0.95 | 142 | ORAF0000 | 21 | 231 |
| 1.00 | 142 | ORAF0000 | 20 | 431 |
| 0.99 | 142 | ORAF0000 | 20 | 354 |
| 0.93 | 142 | ORAF0000 | 29 | 604 |
| 0.95 | 142 | ORAP0000 | 20 | 181 |
| 0.84 | 142 | ORAF0000 | 22 | 261 |
| 0.96 | 142 | ORAP0000 | 21 | 595 |
| 0.94 | 142 | ORAG0000 | 20 | 215 |
| 0.99 | 142 | ORAG0000 | 26 | 890 |
| 0.92 | 142 | ORAG0000 | 29 | 592 |
| 0.83 | 142 | ORAF0000 | 29 | 426 |
| 0.97 | 142 | ORAF0000 | 21 | B28 |
| 0.86 | 142 | ORAP0000 | 21 | 426 |
| 0.96 | 142 | ORAF0000 | 27 | B28 |
| 0.93 | 142 | ORAG0000 | 20 | 090 |
| 0.99 | 142 | ORAE0000 | 28 | D63 |
| 0.90 | 142 | ORAF0000 | 26 | 890 |
| 0.99 | 142 | ORAP0000 | 29 | 592 |
| 0.99 | 142 | ORAG0000 | 29 | 592 |
| 0.99 | 142 | ORAE0000 | 22 | 261 |
| 1.00 | 142 | ORAE0000 | 27 | A05 |
| 0.95 | 142 | ORAF0000 | 20 | 215 |
| 1.00 | 142 | ORAF0000 | 26 | CT |
| 0.93 | 142 | ORAE0000 | 28 | 292 |
| 0.97 | 142 | ORAE0000 | 21 | 426 |
| 0.99 | 147 | ORAG0000 | 21 | 426 |
| 0.99 | 147 | ORAG0000 | 29 | 592 |
| 0.99 | 147 | ORAF0000 | 21 | 426 |
| 0.94 | 147 | ORAF0000 | 21 | 426 |
| 0.99 | 147 | ORAG0000 | 28 | 292 |
| 0.99 | 147 | ORAF0000 | 29 | D67 |
| 0.98 | 147 | ORAE0000 | 20 | 354 |
| 0.96 | 148 | ORAG0000 | 20 | 604 |
| 0.96 | 142 | ORAG0000 | 20 | 354 |
| 0.93 | 142 | ORAE0000 | 27 | 181 |
| 0.91 | 142 | ORAF0000 | 29 | 604 |
| 0.97 | 142 | ORAG0000 | 29 | 604 |
| 0.96 | 142 | ORAE0000 | 22 | 231 |
| 1.00 | 142 | ORAG0000 | 26 | 890 |
| 0.99 | 142 | ORAE0000 | 20 | 354 |
| 0.89 | 143 | ORAF0000 | 21 | 231 |
| 0.87 | 143 | ORAF0000 | 22 | 215 |
| 0.96 | 143 | ORAE0000 | 28 | 292 |
| 0.97 | 143 | ORAG0000 | 20 | 848 |
| 0.92 | 143 | ORAF0000 | 20 | 595 |
| 0.96 | 143 | ORAF0000 | 21 | 848 |
| 0.91 | 143 | ORAF0000 | 26 | 568 |
| 0.91 | 143 | ORAF0000 | 22 | 215 |
| 0.88 | 143 | ORAG0000 | 28 | 292 |
| 0.94 | 143 | ORAG0000 | 29 | 755 |
| 0.94 | 143 | ORAF0000 | 22 | 215 |
| 0.97 | 143 | ORAG0000 | 20 | 354 |
| 0.93 | 143 | ORAF0000 | 22 | 215 |
| 0.92 | 143 | ORAF0000 | 22 | 231 |
| 0.94 | 143 | ORAP0000 | 22 | 231 |
| 0.89 | 215 | OPAE0000 | 22 | 467 |
| 0.47 | 155 | ORAF0000 | 30 | 467 |
| 1.00 | 157 | ORAE0000 | 29 | D67 |
| 0.96 | 145 | ORAE0000 | 28 | 568 |
| 0.88 | 155 | ORAE0000 | 20 | 354 |
| 0.91 | 143 | ORAE0000 | 26 | 261 |
| 0.95 | 155 | ORAE0000 | 28 | 292 |
| 0.89 | 145 | ORAG0000 | 27 | 595 |
| 0.99 | 155 | ORAG0000 | 29 | 592 |
| 0.98 | 155 | ORAG0000 | 20 | 595 |
| 0.99 | 155 | ORAG0000 | 28 | 568 |
| 0.96 | 145 | ORAE0000 | 27 | E86 |
| 0.95 | 155 | ORAE0000 | 26 | 261 |
| 0.92 | 155 | ORAE0000 | 26 | D65 |
| 0.93 | 143 | ORAE0000 | 27 | 604 |
| 0.99 | 155 | ORAE0000 | 28 | 568 |
| 1.00 | 155 | ORAG0000 | 28 | 292 |
| 1.00 | 145 | ORAG0000 | 26 | CT |
| 0.98 | 148 | ORAG0000 | 26 | CT |
| 0.99 | 145 | ORAE0000 | 27 | 604 |
| 0.99 | 142 | ORAE0000 | 27 | 181 |
| 0.91 | 142 | ORAG0000 | 21 | 857 |
| 0.94 | 155 | ORAE0000 | 29 | 890 |
| 1.00 | 145 | ORAE0000 | 27 | 604 |
| 0.97 | 145 | ORAG0000 | 29 | C02 |
| 0.97 | 145 | ORAG0000 | 28 | E19 |
| 0.87 | 155 | ORAE0000 | 27 | 595 |
| 0.95 | 145 | ORAG0000 | 27 | 748 |
| 0.95 | 145 | ORAE0000 | 28 | E19 |
| 0.95 | 152 | ORAE0000 | 20 | 231 |
| 0.99 | 142 | ORAG0000 | 29 | 592 |
| 0.98 | 145 | ORAG0000 | 20 | 637 |
| 0.95 | 155 | ORAG0000 | 20 | 354 |
| 0.99 | 142 | OR4E0000 | 27 | 604 |
| 0.99 | 145 | ORAE0000 | 27 | 604 |
| 0.99 | 145 | ORAE0000 | 28 | D63 |
| 0.99 | 142 | ORAE0000 | 21 | 426 |
| 1.00 | 145 | ORAE0000 | 29 | D67 |
| 1.00 | 141 | ORAG0000 | 878 | 292 |
| 1.00 | 152 | ORAG0000 | 26 | CT |
| 0.98 | 145 | ORAE0000 | 29 | 568 |
| 0.97 | 145 | ORAG0000 | 27 | 152 |
| 0.90 | 142 | ORAG0000 | 26 | 890 |
| 0.95 | 145 | ORAE0000 | 28 | D63 |
| 1.00 | 145 | ORAG0000 | 29 | 568 |

TABLE 1-continued

| YIELD | @MEFAM | @TOOL | @SCREENER | @OPID |
|---|---|---|---|---|
| 0.97 | 145 | ORAE0000 | 27 | 152 |
| 0.95 | 143 | ORAE0000 | 29 | C02 |
| 0.96 | 145 | ORAE0000 | 27 | 637 |
| 0.95 | 145 | ORAE0000 | 27 | 152 |
| 1.00 | 145 | ORAG0000 | 29 | D67 |
| 0.98 | 145 | ORAG0000 | 28 | 568 |
| 1.00 | 143 | ORAG0000 | 29 | 568 |
| 0.94 | 143 | ORAG0000 | 28 | 292 |
| 0.96 | 142 | ORAG0000 | 29 | 604 |
| 0.89 | 145 | OFAE0000 | 27 | 637 |
| 0.98 | 145 | ORAG0000 | 29 | 592 |
| 0.83 | 145 | ORAG0000 | 27 | 637 |
| 0.78 | 143 | ORAE0000 | 27 | 748 |
| 0.97 | 145 | ORAG0000 | 28 | D63 |
| 0.87 | 145 | ORAG0000 | 27 | 152 |
| 0.95 | 145 | ORAG0000 | 27 | 604 |
| 1.00 | 145 | ORAG0000 | 28 | 568 |
| 1.00 | 145 | ORAE0000 | 28 | 568 |
| 0.97 | 145 | ORAE0000 | 28 | 568 |
| 0.96 | 142 | ORAE0000 | 29 | 568 |
| 0.94 | 145 | ORAG0000 | 28 | 568 |
| 0.98 | 145 | ORAG0000 | 26 | 261 |
| 1.00 | 145 | ORAG0000 | 27 | 604 |
| 1.00 | 145 | ORAG0000 | 27 | 512 |
| 0.95 | 145 | ORAG0000 | 27 | 604 |
| 0.95 | 145 | ORAG0000 | 27 | 604 |
| 1.00 | 145 | ORAG0000 | 28 | 568 |
| 1.00 | 145 | ORAG0000 | 28 | 568 |
| 0.99 | 148 | ORAG0000 | 26 | CT |
| 0.94 | 145 | ORAE0000 | 27 | 604 |
| 0.92 | 145 | ORAG0000 | 26 | CT |
| 1.00 | 145 | ORAG0000 | 26 | 261 |
| 1.00 | 145 | ORAE0000 | 28 | 592 |
| 0.97 | 145 | ORAE0000 | 28 | 592 |
| 0.94 | 145 | ORAG0000 | 28 | D63 |
| 0.97 | 145 | ORAG0000 | 26 | 890 |
| 0.97 | 145 | ORAE0000 | 28 | 568 |
| 0.96 | 145 | ORAG0000 | 26 | 261 |
| 0.91 | 145 | ORAE0000 | 27 | B28 |
| 0.91 | 145 | ORAE0000 | 27 | B28 |
| 1.00 | 145 | ORAE0000 | 27 | B28 |
| 1.00 | 145 | ORAE0000 | 27 | 371 |
| 1.00 | 145 | ORAG0000 | 28 | 568 |
| 1.00 | 145 | ORAG0000 | 28 | 592 |
| 0.92 | 145 | ORAG0000 | 29 | 592 |
| 0.94 | 145 | ORAG0000 | 29 | 592 |
| 0.98 | 142 | ORAG0000 | 29 | D67 |
| 0.91 | 145 | ORAE0000 | 29 | D67 |
| 1.00 | 145 | ORAG0000 | 26 | 890 |
| 0.94 | 145 | ORAG0000 | 28 | D63 |
| 0.94 | 145 | ORAE0000 | 28 | D63 |
| 0.94 | 145 | ORAG0000 | 27 | 604 |
| 0.97 | 148 | ORAG0000 | 26 | 261 |
| 1.00 | 145 | ORAG0000 | 26 | 890 |
| 0.93 | 143 | ORAE0000 | 27 | 604 |
| 0.97 | 145 | ORAG0000 | 29 | 592 |
| 1.00 | 145 | ORAE0000 | 28 | 568 |
| 0.95 | 145 | ORAE0000 | 27 | 604 |
| 0.99 | 148 | ORAE0000 | 29 | 592 |
| 0.93 | 143 | ORAE0000 | 28 | D63 |
| 1.00 | 145 | ORAG0000 | 26 | 890 |
| 0.92 | 145 | ORAG0000 | 29 | C02 |
| 0.74 | 145 | ORAE0000 | 29 | C02 |
| 1.00 | 145 | ORAE0000 | 26 | 890 |
| 1.00 | 145 | ORAG0000 | 29 | D67 |
| 1.00 | 145 | ORAE0000 | 29 | D67 |
| 0.97 | 145 | ORAG0000 | 27 | 371 |
| 0.65 | 145 | ORAG0000 | 28 | D63 |
| 0.99 | 145 | ORAG0000 | 29 | C02 |
| 1.00 | 145 | ORAG0000 | 28 | 568 |
| 1.00 | 155 | ORAE0000 | 28 | 292 |
| 0.81 | 145 | ORAG0000 | 28 | 568 |
| 0.97 | 143 | ORAE0000 | 28 | 292 |
| 0.98 | 145 | ORAG0000 | 28 | 568 |
| 0.99 | 148 | ORAG0000 | 28 | D63 |
| 0.98 | 142 | ORAE0000 | 29 | 152 |
| 0.96 | 145 | ORAE0000 | 29 | 592 |
| 0.94 | 145 | ORAG0000 | 29 | C02 |
| 0.96 | 145 | ORAG0000 | 28 | 568 |
| 1.00 | 145 | ORAE0000 | 29 | C02 |
| 0.98 | 145 | ORAG0000 | 28 | 292 |
| 0.87 | 145 | ORAE0000 | 27 | 604 |
| 0.81 | 145 | ORAE0000 | 27 | 371 |
| 0.93 | 145 | ORAE0000 | 27 | B28 |
| 0.99 | 145 | ORAE0000 | 26 | CT |
| 0.98 | 145 | ORAE0000 | 26 | CT |
| 0.99 | 145 | ORAE0000 | 26 | CT |
| 0.86 | 145 | ORAG0000 | 27 | 371 |
| 0.97 | 145 | ORAE0000 | 29 | 592 |
| 0.92 | 145 | ORAG0000 | 28 | D63 |
| 0.97 | 143 | ORAG0000 | 26 | 890 |
| 0.99 | 145 | ORAG0000 | 26 | 261 |
| 0.95 | 145 | ORAE0000 | 28 | 568 |
| 0.98 | 145 | ORAG0000 | 29 | D67 |
| 1.00 | 145 | ORAE0000 | 29 | D67 |
| 0.97 | 143 | ORAG0000 | 28 | D67 |
| 0.94 | 143 | ORAG0000 | 26 | OCT |
| 0.97 | 147 | ORAG0000 | 27 | B28 |
| 0.99 | 145 | ORAE0000 | 28 | D63 |
| 0.99 | 145 | ORAG0000 | 28 | 568 |
| 0.98 | 145 | ORAE0000 | 26 | CT |
| 0.95 | 145 | ORAG0000 | 26 | 261 |
| 0.96 | 145 | ORAE0000 | 27 | 604 |
| 1.00 | 155 | ORAG0000 | 26 | 890 |
| 0.99 | 155 | ORAG0000 | 29 | 568 |
| 0.97 | 155 | ORAG0000 | 29 | D67 |
| 0.99 | 155 | ORAE0000 | 28 | 568 |
| 0.98 | 148 | ORAE0000 | 28 | 292 |
| 0.98 | 143 | ORAE0000 | 28 | D63 |
| 0.97 | 143 | ORAE0000 | 27 | 604 |
| 0.99 | 155 | ORAG0000 | 28 | 292 |
| 0.96 | 143 | ORAE0000 | 29 | 592 |
| 1.00 | 152 | ORAG0000 | 28 | D63 |
| 1.00 | 155 | ORAE0000 | 26 | 849 |
| 0.97 | 145 | ORAE0000 | 26 | 890 |
| 1.00 | 145 | ORAG0000 | 26 | CT |
| 0.94 | 145 | ORAE0000 | 28 | 568 |
| 0.84 | 145 | ORAG0000 | 28 | 568 |
| 0.96 | 142 | ORAG0000 | 29 | 592 |
| 0.99 | 145 | ORAE0000 | 29 | 592 |
| 0.95 | 142 | ORAH0000 | 26 | CT |
| 0.89 | 142 | ORAE0000 | 27 | B28 |
| 0.97 | 142 | ORAE0000 | 28 | D63 |
| 0.81 | 142 | ORAE0000 | 26 | 890 |
| 0.94 | 148 | ORAE0000 | 878 | 292 |
| 0.95 | 143 | ORAG0000 | 29 | 592 |
| 0.93 | 155 | ORAG0000 | 28 | 568 |
| 0.98 | 142 | ORAG0000 | 29 | C02 |
| 0.99 | 142 | ORAE0000 | 29 | 090 |
| 0.94 | 155 | ORAG0000 | 29 | 592 |
| 6.94 | 143 | ORAG0000 | 28 | D63 |
| 0.99 | 145 | ORAG0000 | 29 | C02 |
| 0.99 | 155 | ORAG0000 | 28 | 568 |
| 0.92 | 153 | ORAE0000 | 27 | 604 |
| 0.98 | 153 | ORAG0000 | 28 | 568 |
| 1.00 | 155 | ORAG0000 | 876 | E19 |
| 0.94 | 143 | ORAE0000 | 27 | B28 |
| 0.94 | 145 | ORAE0000 | 29 | 090 |
| 0.94 | 143 | ORAG0000 | 20 | 637 |
| 0.95 | 145 | ORAG0000 | 27 | 604 |
| 0.99 | 142 | ORAG0000 | 29 | 592 |
| 0.92 | 143 | ORAE0000 | 27 | B28 |
| 0.96 | 145 | ORAG0000 | 876 | CT |
| 0.99 | 155 | ORAE0000 | 29 | 592 |
| 0.94 | 147 | ORAG0000 | 28 | 292 |
| 0.91 | 153 | ORAE0000 | 877 | B28 |
| 0.97 | 152 | ORAG0000 | 28 | 637 |
| 1.00 | 155 | ORAG0000 | 26 | 161 |
| 0.99 | 142 | ORAG0000 | 879 | 890 |
| 0.94 | 145 | ORAG0000 | 879 | 090 |
| 0.95 | 143 | ORAG0000 | 29 | 592 |
| 0.94 | 145 | ORAG0000 | 876 | 261 |
| 0.96 | 153 | ORAG0000 | 877 | 748 |
| 0.96 | 145 | ORAE0000 | 876 | CT |

TABLE 1-continued

| YIELD | @MEFAM | @TOOL | @SCREENER | @OPID |
|---|---|---|---|---|
| 0.98 | 155 | ORAE0000 | 879 | C02 |
| 0.95 | 155 | ORAG0000 | 26 | 261 |
| 0.92 | 155 | ORAE0000 | 876 | CT |
| 0.92 | 155 | ORAG0000 | 28 | 770 |
| 1.00 | 142 | ORAG0000 | 879 | 890 |
| 0.93 | 155 | ORAG0000 | 877 | 604 |
| 0.98 | 145 | ORAG0000 | 879 | 592 |
| 0.94 | 143 | ORAE0000 | 877 | 748 |
| 0.97 | 145 | ORAE0000 | 878 | 770 |
| 0.88 | 147 | ORAE0000 | 876 | CT |
| 0.97 | 155 | ORAE0000 | 879 | 770 |
| 0.95 | 145 | ORAE0000 | 890 | 890 |
| 0.97 | 143 | ORAE0000 | 26 | 890 |
| 0.96 | 145 | ORAE0000 | 877 | 604 |
| 0.97 | 145 | ORAE0000 | 28 | 568 |
| 0.59 | 153 | ORAE0000 | 876 | 152 |
| 0.96 | 142 | ORAE0000 | 28 | 292 |
| 0.94 | 153 | ORAE0000 | 877 | 748 |
| 0.97 | 153 | ORAE0000 | 879 | C02 |
| 0.98 | 145 | ORAG0000 | 878 | D63 |
| 0.99 | 152 | ORAG0000 | 878 | D63 |
| 1.00 | 145 | ORAG0000 | 28 | 568 |
| 0.98 | 152 | ORAG0000 | 21 | C02 |
| 0.83 | 145 | ORAE0000 | 877 | 770 |
| 0.97 | 145 | ORAE0000 | 879 | 592 |
| 0.84 | 145 | ORAE0000 | 877 | 770 |
| 0.96 | 141 | ORAG0000 | 876 | 152 |
| 0.99 | 141 | ORAG0000 | 876 | 261 |
| 0.96 | 145 | ORAE0000 | 879 | 890 |
| 0.99 | 145 | ORAE0000 | 879 | C02 |
| 0.99 | 142 | ORAE0000 | 20 | 354 |
| 0.94 | 155 | ORAG0000 | 878 | D63 |
| 0.80 | 145 | ORAE0000 | 876 | CT |
| 0.88 | 145 | ORAE0000 | 877 | A18 |
| 0.98 | 143 | ORAG0000 | 29 | 592 |
| 0.91 | 143 | ORAG0000 | 877 | B28 |
| 0.85 | 143 | ORAE0000 | 877 | A18 |
| 0.91 | 152 | ORAE0000 | 877 | 604 |
| 0.99 | 145 | ORAE0000 | 878 | 568 |
| 0.80 | 145 | ORAG0000 | 877 | 604 |
| 0.93 | 145 | ORAE0000 | 879 | 890 |
| 0.94 | 145 | ORAE0000 | 878 | 748 |
| 0.98 | 147 | ORAE0000 | 876 | D77 |
| 0.90 | 143 | ORAE0000 | 878 | 568 |
| 1.00 | 145 | ORAE0000 | 878 | 568 |
| 0.92 | 141 | ORAE0000 | 26 | 261 |
| 0.97 | 145 | ORAE0000 | 29 | SM |
| 0.94 | 145 | ORAG0000 | 87 | 604 |
| 0.95 | 143 | ORAE0000 | 878 | 568 |
| 0.99 | 145 | ORAE0000 | 878 | 568 |
| 0.92 | 145 | ORAG0000 | 879 | 879 |
| 0.98 | 145 | ORAE0000 | 878 | 568 |
| 1.00 | 155 | ORAG0000 | 879 | SM |
| 0.95 | 145 | ORAG0000 | 879 | C02 |
| 0.97 | 155 | ORAG0000 | 879 | SM |
| 0.96 | 155 | ORAG0000 | 879 | 770 |
| 0.97 | 155 | ORAG0000 | 878 | 568 |
| 0.96 | 145 | ORAE0000 | 879 | 890 |
| 0.98 | 142 | ORAG0000 | 29 | 748 |
| 0.99 | 147 | ORAE0000 | 876 | D67 |
| 1.00 | 145 | ORAE0000 | 879 | 890 |
| 0.99 | 145 | ORAE0000 | 877 | 604 |
| 0.96 | 155 | ORAE0000 | 876 | D63 |
| 0.96 | 143 | ORAE0000 | 29 | SM |
| 0.76 | 145 | ORAE0000 | 877 | 152 |
| 0.97 | 145 | ORAG0000 | 877 | 604 |
| 1.00 | 155 | ORAE0000 | 879 | 371 |
| 1.00 | 155 | ORAG0000 | 878 | 349 |
| 1.00 | 155 | ORAG0000 | 879 | SM |
| 0.97 | 155 | ORAG0000 | 877 | C09 |
| 0.12 | 155 | ORAE0000 | 877 | 090 |
| 0.99 | 145 | ORAG0000 | 879 | SM |
| 0.86 | 145 | ORAG0000 | 876 | D77 |
| 0.96 | 145 | ORAE0000 | 29 | C02 |
| 0.99 | 145 | ORAG0000 | 878 | 568 |
| 0.99 | 145 | ORAE0000 | 878 | 568 |
| 0.98 | 145 | ORAE0000 | 877 | 604 |
| 0.94 | 145 | ORAE0000 | 877 | D67 |
| 0.97 | 145 | ORAE0000 | 876 | 261 |
| 0.95 | 145 | ORAE0000 | 878 | D63 |
| 0.99 | 145 | ORAE0000 | 878 | 568 |
| 1.00 | 145 | ORAG0000 | 29 | C02 |
| 1.00 | 145 | ORAE0000 | 876 | D77 |
| 1.00 | 145 | ORAG0000 | 879 | SM |
| 0.97 | 155 | ORAE0000 | 876 | CT |
| 0.91 | 155 | ORAE0000 | 879 | SM |
| 0.63 | 155 | ORAG0000 | 876 | D77 |
| 0.97 | 155 | ORAE0000 | 876 | 261 |
| 1.00 | 155 | ORAE0000 | 878 | 568 |
| 1.00 | 155 | ORAE0000 | 876 | CT |
| 0.94 | 155 | ORAE0000 | 877 | D67 |
| 0.97 | 155 | ORAG0000 | 878 | 568 |
| 0.96 | 155 | ORAG0000 | 877 | B28 |
| 1.00 | 155 | ORAG0000 | 878 | 568 |
| 0.93 | 155 | ORAG0000 | 877 | D67 |
| 1.00 | 155 | ORAG0000 | 878 | 292 |
| 0.95 | 155 | ORAG0000 | 876 | 261 |
| 0.95 | 155 | ORAG0000 | 879 | SM |
| 1.00 | 155 | ORAG0000 | 879 | 879 |
| 0.96 | 143 | ORAE0000 | 877 | B28 |
| 0.93 | 145 | ORAG0000 | 877 | C09 |
| 0.99 | 145 | ORAG0000 | 878 | 568 |
| 0.95 | 143 | ORAE0000 | 877 | 604 |
| 0.99 | 152 | ORAE0000 | 878 | C02 |
| 0.97 | 145 | ORAE0000 | 877 | 604 |
| 0.97 | 155 | ORAG0000 | 877 | 604 |
| 0.96 | 145 | ORAG0000 | 879 | 261 |
| 1.00 | 145 | ORAG0000 | 876 | 152 |
| 0.96 | 143 | ORAE0000 | 877 | 604 |
| 0.97 | 145 | ORAG0000 | 879 | SM |
| 0.98 | 155 | ORAE0000 | 876 | 261 |
| 0.94 | 145 | ORAE0000 | 879 | SM |
| 0.94 | 145 | ORAE0000 | 878 | 292 |
| 0.83 | 145 | ORAG0000 | 877 | 604 |
| 0.92 | 145 | ORAG0000 | 877 | 604 |
| 0.98 | 145 | ORAG0000 | 879 | 604 |
| 0.97 | 145 | ORAG0000 | 878 | 349 |
| 0.93 | 153 | ORAG0000 | 877 | 604 |
| 1.00 | 145 | ORAE0000 | 879 | SM |
| 0.97 | 145 | ORAE0000 | 878 | 568 |
| 0.93 | 145 | ORAE0000 | 876 | D63 |
| 0.76 | 145 | ORAG0000 | 877 | 748 |
| 0.97 | 142 | ORAE0000 | 29 | 592 |
| 0.91 | 143 | ORAG0000 | 878 | C02 |
| 0.96 | 143 | ORAE0000 | 878 | 568 |
| 1.00 | 145 | ORAE0000 | 878 | 568 |
| 0.98 | 155 | ORAE0000 | 876 | CT |
| 0.98 | 155 | ORAG0000 | 876 | 261 |
| 0.89 | 143 | ORAE0000 | 877 | B28 |
| 0.86 | 145 | ORAE0000 | 877 | 152 |
| 0.41 | 143 | ORAG0000 | 877 | 152 |
| 0.96 | 145 | ORAE0000 | 877 | 748 |

The first column in Table 1 contains yield information in terms of measure signals 212 that have been normalized by processor 214. Columns 2–5 contain an alpha-numeric representation of ID signals 208 for the individual attributes 1 through K. Each row of Table 1 represents a particular manufacturing run; therefore, the normalized value of the measure signal 212 appearing in a row is a yield for that particular manufacturing run and the alphanumeric representations of the ID signals 208 indicate the individual attributes that contributed to that particular manufacturing run.

The convergent weighted averages for each of the attributes are described in Table 2.

TABLE 2

Attributes analysis of YIELD vs MEFAM, TOOL, SCREENER and OPID.
Cleaned up SAMPLE DATA data file contained 836 records.
Yields quoted are self-consistent, weighted avarages.

| MEFAM | YIELD | TOOL | YIELD | SCREENER | YIELD | OPID | YIELD |
|---|---|---|---|---|---|---|---|
| 314 | 0.99 | ORAG0000 | 0.947 | 878 | 0.972 | 120 | 1 |
| 157 | 0.983 | ORAE0000 | 0.94 | 879 | 0.971 | 867 | 1 |
| 147 | 0.975 | ORAF0000 | 0.933 | 29 | 0.963 | 512 | 1 |
| 148 | 0.973 | | | 28 | 0.951 | 849 | 1 |
| 151 | 0.973 | | | 890 | 0.95 | 431 | 0.98 |
| 152 | 0.967 | | | 26 | 0.948 | 680 | 0.98 |
| 141 | 0.958 | | | 20 | 0.945 | 004 | 0.98 |
| 142 | 0.953 | | | 87 | 0.94 | 349 | 0.975 |
| 155 | 0.947 | | | 27 | 0.939 | 592 | 0.972 |
| 145 | 0.942 | | | 23 | 0.935 | SM | 0.972 |
| 143 | 0.913 | | | 22 | 0.931 | D6J | 0.97 |
| 153 | 0.899 | | | 876 | 0.926 | 800 | 0.97 |
| 215 | 0.89 | | | 21 | 0.918 | 560 | 0.968 |
| | | | | 877 | 0.899 | E19 | 0.966 |
| | | | | 290 | 0.83 | A05 | 0.965 |
| | | | | 30 | 0.779 | 568 | 0.964 |
| | | | | | | A56 | 0.964 |
| | | | | | | CT | 0.962 |
| | | | | | | E86 | 0.96 |
| | | | | | | 879 | 0.96 |
| | | | | | | 292 | 0.96 |
| | | | | | | 429 | 0.955 |
| | | | | | | 637 | 0.955 |
| | | | | | | C02 | 0.954 |
| | | | | | | D67 | 0.951 |
| | | | | | | 261 | 0.949 |
| | | | | | | 595 | 0.948 |
| | | | | | | 090 | 0.947 |
| | | | | | | C09 | 0.947 |
| | | | | | | 181 | 0.945 |
| | | | | | | 604 | 0.944 |
| | | | | | | 426 | 0.942 |
| | | | | | | 791 | 0.94 |
| | | | | | | 037 | 0.94 |
| | | | | | | OCT | 0.94 |
| | | | | | | 354 | 0.939 |
| | | | | | | 215 | 0.937 |
| | | | | | | 225 | 0.936 |
| | | | | | | 231 | 0.936 |
| | | | | | | C02 | 0.935 |
| | | | | | | 890 | 0.935 |
| | | | | | | 371 | 0.933 |
| | | | | | | D63 | 0.933 |
| | | | | | | 755 | 0.932 |
| | | | | | | B28 | 0.932 |
| | | | | | | 669 | 0.93 |
| | | | | | | C79 | 0.928 |
| | | | | | | 097 | 0.925 |
| | | | | | | 748 | 0.926 |
| | | | | | | A18 | 0.918 |
| | | | | | | 555 | 0.915 |
| | | | | | | 569 | 0.912 |
| | | | | | | 063 | 0.91 |
| | | | | | | D05 | 0.91 |
| | | | | | | 857 | 0.908 |
| | | | | | | 233 | 0.907 |
| | | | | | | D65 | 0.9 |
| | | | | | | 770 | 0.899 |
| | | | | | | 848 | 0.892 |
| | | | | | | 152 | 0.872 |
| | | | | | | 391 | 0.87 |
| | | | | | | D77 | 0.867 |
| | | | | | | 432 | 0.86 |
| | | | | | | 255 | 0.86 |
| | | | | | | 467 | 0.826 |

For each individual ID signal 208 a self-consistent weighted average has been calculated and is displayed. The report in Table 2 is sorted on ID signal 208 and arranged in order of "best" individual attribute to "worst" individual attribute. For example, screener ID 878 has a self-consistent weighted average of 0.972 while screener 30 has a self-consistent weighted average of 0.779. This tells the reader of this report that, independent of the variations in and contributions of the other attributes in the manufacturing run, screener 878 is a higher quality screener than screener 30.

Figure 3:
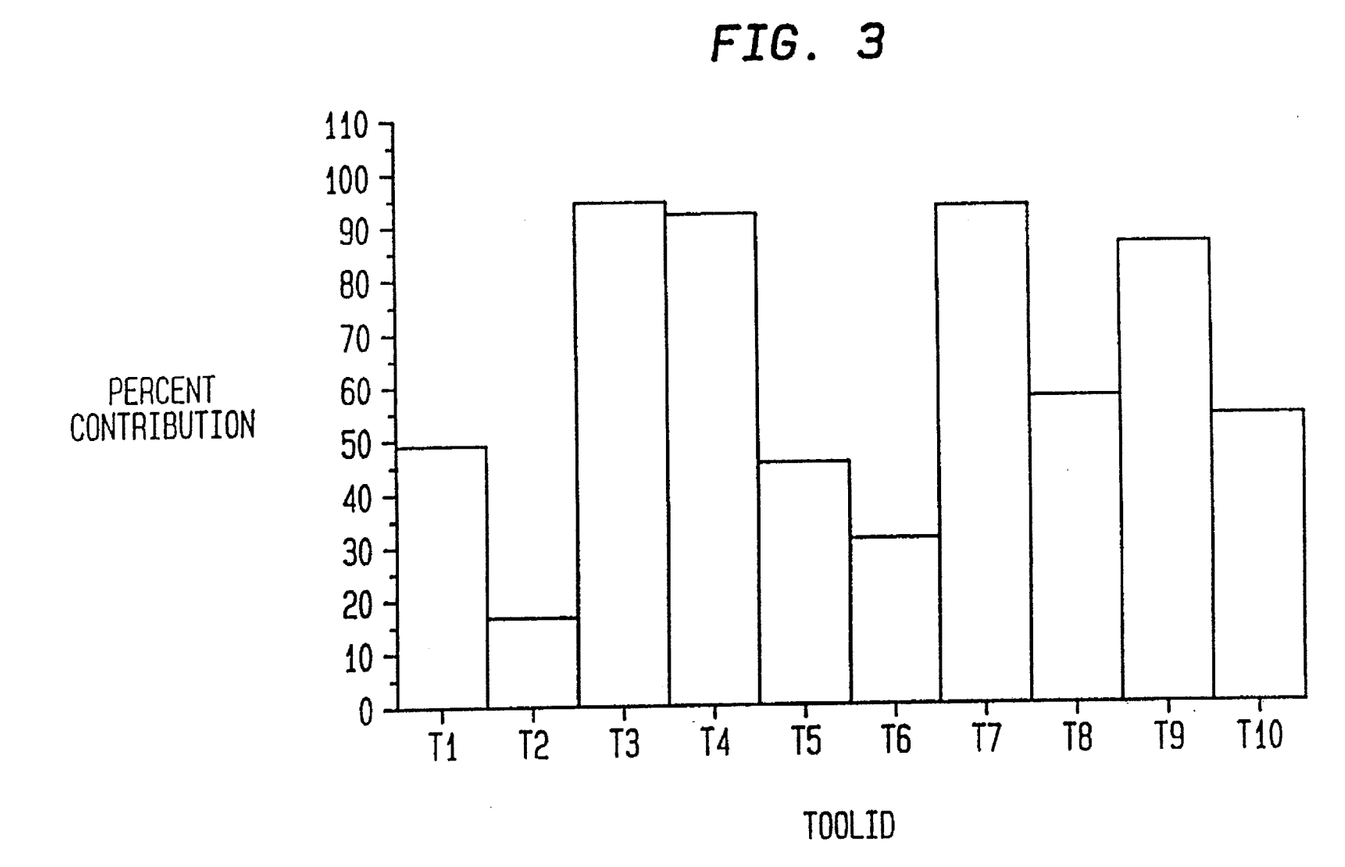
FIG. 3 is an example of a graphical representation of the self-consistent weighted averages of each of the individual attributes.

FIG. 3 is an example of a graphical representation of the self-consistent weighted averages of each of the individual attributes. This provides an at-a-glance review of the quality of each attribute with respect to each of the other attributes in its class.

The preferred embodiment can also be described with the aid of mathematical expressions. Each measure $Y_i$ is the product of the weights of all k of its attributes. This can be shown by the expression:

$$Y_i = \prod_{j(i)=1}^{k} W_{ij(i)}$$

where $W_{ij(i)}$ is the weight of the $j_i$th member of the ith attribute and $Y_i$ is normalized between epsilon and 1 where epsilon is a small positive number (say $10^{-13}$). The use of an epsilon obviates the need to treat 0 weights.

The iteration equation for computing the attributes' weights is $$W_{ij(i)} = \sum_m \frac{W_{ij(i)} Y_{mj(i)}}{\prod_n W'_{n,ij(i)}}$$

where $Y_{mj(i)}$ is the mth measure associated with $W_{ij(i)}$ and $W'_{n,ij(i)}$ is the nth attribute weight associated with $Y_{mj(i)}$ with the exception of $W_{ij(i)}$ itself.

The preferred embodiment describes a correlation given by the ratio of current attribute weight to the product of all other weights associated with a given normalized measure. The new attribute weight is the weighted average of all associated performance measures.

An alternative embodiment can be described for computing correlations given by the ratio of current attribute weight to the sum of all other weights associated with the given normalized measure. The new attribute weight is the weighted sum of all associated performance measures.

The alternative embodiment also can be described with the aid of mathematical expressions. In the alternative embodiment, each measure $Y_i$ is the sum of the weight of all k of its attributes. This can be shown by the expression:

$$Y_i = \sum_{j(i)=1}^{k} W_{ij(i)}$$

where $W_{ij(i)}$ is the weight of the $j(i)$ the member of the ith attribute.

The iteration equation for the alternative method is $$W_{ij(i)} = \sum_m \frac{W_{ij(i)} Y_{mj(i)}}{\sum_n W'_{n,ij(i)}}$$

Typically, the first embodiment converges faster. The selection of the correlation in the weighted sum guarantees fast convergence due to its highly non-linear structure which highlights the relative contributions in the selected ratio. Oscillations, that occur in other iterative techniques, do not occur here due to the smoothing effects of the weighted sum.

An embodiment of the present invention is illustrated by the source code listing which appears in the Appendix.

3. Conclusion

While various embodiments of the present invention have been described above, it should be understood that they have been presented by way of example only, and not limitation. Thus, the spirit and scope of the present invention should not be limited by any of the above-described exemplary embodiments, but should be defined only in accordance with the following claims and their equivalents.

---

FILE: ATTR    PRINTAPL F1 Conversational Monitor System    APPENDIX
92/01/14 15:33:38 * * * Function ATTR * * *

```
        ∇ Z←ATTR YX;Y;X;N8;K;I;J;U;B;N;IT;W;BUF;WOLD;NT
 [1]  ⍝
 [2]  ⍝ SUMMARY OF ATTRIBUTE DATA
 [3]  ⍝
 [4]  ⍝ YX = MATRIX WITH CONTINUOUS MEASURE IN 1ST COLUMN. TAGS IN OTHERS.
 [5]  ⍝ RETURNS: Z = VECTOR OF (ENCLOSED) MEANS OF 1ST COLUMN, FOR TAG COLUMNS.
 [6]  ⍝ E.G. ⊃Z = TAGS AND MEANS OF ALL UNIQUE TAGS IN COLUMN I+1 OF YX.
 [7]  ⍝
 [8]     NT←20                          ⍝ MAX OF 20 ITERATIONS
 [9]     N←1↑⍴YX                        ⍝ NO. OF OBSERVATIONS
[10]     X←(0 1)↓YX                     ⍝ TAGS (IN COLUMNS)
[11]     N8←8⌈⌈/⍴¨⍕¨"X"                 ⍝ MAX OF 8 OR LENGTH OF LONGEST TAG
[12]     K←1↓⍴X                         ⍝ NO. OF TAG COLUMNS
[13]     Y←(⍴YX)⍴1                      ⍝ INITIALIZE Y WITH 1'S
[14]     Y[;1]←⍎¨ ⍕YX[;1]               ⍝ DEPENDENT VARIABLE (CONT. MEASURE)
[15]  ⍝
[16]     U←Z←K⍴0
[17]     I←0
[18] L1:I←I+1                           ⍝ INITIALIZE COLUMNS COUNTER
[19]     X[;I]←N8↑⍕X[;I]                ⍝ INCREMENT COLUMNS COUNTER
[20]     U[I]←⊂((B⍳B)=⍳⍴B)/B←,B←X[;I]   ⍝ TAKE LARGEST TAG LENGTH FOR EACH TAG
[21]     →(I<K)/L1                      ⍝ UNIQUE TAGS IN I'TH COLUMN OF X
[22]  ⍝⎕←,DBL"⊃U
[23]     W←0
[24]  ⍝    * * * * * * * * * * * U[I] CONTAINS UNIQUE TAGS IN I'TH COLUMN OF X * * * * * * * * * * * *
[25]     IT←0                           ⍝ INITIALIZE ITERATION COUNTER
[26] L:IT←IT+1
[27]     WOLD←W                         ⍝ UDATE OLD WEIGHTS
[28]     W←K⍴0
[29]     I←0                            ⍝ INITIALIZE COLUMN COUNTER
[30] LI:I←I+1                           ⍝ INCREMENT COLUMN COUNTER
[31]     J←0                            ⍝ INITIALIZE TAGS COUNTER
[32] LJ:J←J+1                           ⍝ INCREMENT TAGS COUNTER
```

-continued

```
[33]  B+('/'(⊐U)[J]=X[;I])+Y           ⍝ USE J'TH UNIQUE TAG TO SELECT Y ITEMS
[34]  BUF+B[;I+1]+×/B[;(1+ιI-1),I+1+ιK-I]  ⍝ WEIGHTS
[35]  W[I]+⊂(⊐W[I]),+/B[;1]×BUF÷+/BUF   ⍝ WEIGHTED Y_MEAN
[36]  →(J<ρI⊐U)/LJ                      ⍝ LOOP TO NEXT TAG IF NOT FINISHED
[37]  →(I<K)/LI                         ⍝ LOOP TO NEXT COLUMN IF NOT FINISHED
[38]  W+1+"W                            ⍝ DROP THE INITIAL 0'S
[39]  →(1E¯6>⌈/((,⊐W)-(,⊐WOLD))÷⌈/,⊐W)/O  ⍝ EXIT IF MAX FRACTIONAL DIFF < 1E¯6
[40]  ⍝ * * * * * * * * * * * * * W[I] CONTAINS WEIGHTS OF U[I] TAGS * * * * * * * * * * * * *
[41]  BUF+(,⊐U)ιX                       ⍝ INDICES OF X TAGS IN NESTED VECTOR U
[42]  BUF+(,⊐W)[BUF]                    ⍝ MATRIX OF CORRESPONDING WEIGHTS
[43]  Y+Y[;1],BUF                       ⍝ UPDATED Y WITH NEW WEIGHTS
[44]  ⍝□+W
[45]  →(IT<NT)/L
[46]  ⍝ * * * * * * * * * * * * * BELOW FORMAT RESULTS FOR OUTPUT * * * * * * * * * * * * *
[47]  O:
[48]  I+0
[49]  LO:I+I+1
[50]  Z[I]+⊂(⊐U[I]),((ρI⊐W),1)ρI⊐W      ⍝ PAIRS OF TAG-ID AND YIELD IN COLUMNS
[51]  (I⊐Z)+(I⊐Z)[▼(I⊐Z)[;2];]          ⍝ SORT IN DECREASING YIELDS ORDER
[52]  →(I<K)/LO
      ∇
```

Having thus described our invention, what we claim as new and desire to secure by Letters Patent is:

1. A computer operated method for quantitatively determining the performance of a plurality of non-numeric attributes of a manufacturing line, comprising the steps of:
   (a) recording in a computer processor database a measure signal for each of a plurality of manufacturing runs on the manufacturing line, wherein each said measure signal comprises a data signal representing an output measure of the manufacturing line, and said data signals are obtained by operating the manufacturing line to produce a product;
   (b) recording in said computer processor database attribute ID signals associated with each of said plurality of manufacturing runs, wherein each of said attribute ID signals identifies a non-numeric attribute that contributed to the manufacturing run;
   (c) normalizing said recorded measure signal for each of said plurality of manufacturing runs; and
   (d) using a convergent iterative process to deconvolute said normalized recorded measure signals and said attribute ID signals to generate a quantitative numeric measure signal for the non-numeric attributes.

2. The method of claim 1, wherein said step (d) further comprises the steps of:
   (i) selecting manufacturing runs to which a selected one of the plurality of non-numeric attributes contribute;
   (ii) ascribing said recorded measure signal for each selected run to said selected non-numeric attribute;
   (iii) determining a weighted average of all said ascribed measure signals to generate said quantitative numeric measure signal for said selected non-numeric attribute; and
   (iv) repeating said steps (i)–(iii) for each of the plurality of non-numeric attributes to generate said quantitative numeric measure signal for each of the plurality of non-numeric attributes.

3. The method of claim 2, further comprising the steps of:
   (v) computing a refined quantitative numeric measure signal for a selected one of the plurality of non-numeric attributes as a ratio between said normalized measure signal and a product of said quantitative numeric measure signals of all other non-numeric attributes; and
   (vi) repeating said steps (i)–(iii) for each of the plurality of non-numeric attributes to generate said quantitative numeric measure signal for each of the plurality of non-numeric attributes.

4. The method of claim 3, further comprising the step of repeating said steps (v)–(vi) until said refined quantitative numeric measure signals converge.

5. The method of claim 1, wherein said step (c) comprises the steps of subtracting a value $\epsilon$ from said recorded measure signal and dividing this result by a maximum said recorded measure signal to normalize said recorded measure signal of each manufacturing run to value between $\epsilon$ and one.

6. The method of claim 1, further comprising the step of editing manufacturing runs containing anomalous data points.

7. The method of claim 1, further comprising the step of:
   (e) adjusting the non-numeric attributes based on said quantitative numeric measure signal to optimize the manufacturing line, wherein production of said product is optimized as a result of said adjusting.

8. A system for quantitatively determining the performance of a plurality of non-numeric attributes of a manufacturing line, comprising:
   (a) means for recording a measure signal for each of a plurality of manufacturing runs on the manufacturing line, wherein each said measure signal comprises a data signal indicating an output measure of the manufacturing line and said data signals are obtained by operating the manufacturing line to produce a product;
   (b) means for recording attribute ID signals associated with each of said plurality of manufacturing runs, wherein each of said attribute ID signals identifies a non-numeric attribute that contributed to the manufacturing run;
   (c) means for normalizing said recorded measure signal for each of said plurality of manufacturing runs; and
   (d) means for deconvoluting said normalized recorded measure signals and attribute ID signals using a convergent iterative process to generate a quantitative numeric measure signal for the non-numeric attributes.

9. The system of claim 8, wherein said means for deconvoluting comprises:
   (i) means for selecting manufacturing runs to which a selected one of the plurality of non-numeric attributes contributed;
   (ii) means for ascribing said recorded measure signal for each selected run to said selected non-numeric attribute; and (iii) means for determining a weighted average of all said ascribed measure signals to generate said quantitative numeric measure signal for said selected non-numeric attribute.

10. The system of claim 9, wherein said means for deconvoluting further comprises means for computing a refined quantitative numeric measure signal for a selected one of the plurality of non-numeric attributes as a ratio between said normalized measure signal and a product of said quantitative numeric measure signals of all other non-numeric attributes.

11. The system of claim 8, wherein said means for normalizing comprises means for editing manufacturing runs containing anomalous data points.

* * * * *